(12) United States Patent
Lin et al.

(10) Patent No.: US 12,274,244 B2
(45) Date of Patent: Apr. 15, 2025

(54) PHYSIOLOGICAL INFORMATION SENSING DEVICE AND METHOD

(71) Applicant: INDUSTRIAL TECHNOLOGY RESEARCH INSTITUTE, Hsinchu (TW)

(72) Inventors: Hong-Dun Lin, Hsinchu (TW); Chih-Kang Ma, Taoyuan (TW); Chun Jen Yin, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 114 days.

(21) Appl. No.: 18/089,937

(22) Filed: Dec. 28, 2022

(65) Prior Publication Data
US 2024/0215542 A1 Jul. 4, 2024

(51) Int. Cl.
A01K 29/00 (2006.01)
H04B 1/10 (2006.01)

(52) U.S. Cl.
CPC ......... A01K 29/005 (2013.01); H04B 1/1018 (2013.01)

(58) Field of Classification Search
CPC .............. A01K 29/005; H04B 1/1018
See application file for complete search history.

(56) References Cited

U.S. PATENT DOCUMENTS

| 2016/0235368 A1* | 8/2016 | Akkermans | .......... A61B 5/7203 |
| 2021/0275105 A1 | 9/2021 | Peng et al. | |
| 2022/0079464 A1 | 3/2022 | Steinberg | |
| 2022/0151207 A1 | 5/2022 | Mott | |

FOREIGN PATENT DOCUMENTS

| BR | PI0401067 A | 9/2005 |
| CA | 2747157 A1 | 1/2013 |
| CA | 2735850 C | 4/2017 |
| CA | 2963984 C | 2/2020 |
| CA | 2955810 C | 3/2021 |

(Continued)

OTHER PUBLICATIONS

TW Office Action dated May 31, 2023 as received in Application No. 111150281.

Primary Examiner — Quan Zhen Wang
Assistant Examiner — Mancil Littlejohn, Jr.
(74) Attorney, Agent, or Firm — Maschoff Brennan

(57) ABSTRACT

A physiological information sensing device includes a signal generator, a transmitting antenna, first and second receiving antennas, a signal processing circuit and a computing element. The signal processing circuit includes a mixer, first and second band pass filters. The transmitting antenna transmits a microwave signal generated by the signal generator. The first receiving antenna and the second receiving antenna receive first and second reflected signals respectively. The mixer integrates the first and second reflected signals, and performs demodulation to generate a demodulated signal. The first band pass filter filters the demodulated signal based on a first frequency domain to generate a first filtered signal, and the first second pass filter filters the demodulated signal based on a second frequency domain to generate a second filtered signal. The computing element outputs a heart rate and a respiration rate according to the first and second filtered signals.

15 Claims, 16 Drawing Sheets

(56) References Cited

FOREIGN PATENT DOCUMENTS

| | | | | | |
|---|---|---|---|---|---|
| CA | 2902912 | C | | 2/2022 | |
| CN | 100426505 | C | * | 10/2008 | ......... H01L 23/5223 |
| CN | 106264502 | A | | 1/2017 | |
| CN | 110224726 | A | * | 9/2019 | ............ H04B 1/005 |
| CN | 113960593 | A | | 1/2021 | |
| CN | 113534141 | A | | 10/2021 | |
| JP | 2019013479 | A | * | 1/2019 | |
| TW | I790752 | B | * | 9/2019 | |
| TW | I721806 | B | | 3/2021 | |
| WO | 2016030875 | A1 | | 3/2016 | |

* cited by examiner

PHYSIOLOGICAL INFORMATION SENSING DEVICE AND METHOD

TECHNICAL FIELD

The present disclosure is related to a physiological information sensing device and method.

BACKGROUND

Currently, the whole world is paying more and more attention to pets, and owners have higher requirements for the environment for raising pets, the health of pets themselves, etc. For example, more and more pet owners will conduct regular health checks for their pets to ensure that they are free from diseases that cannot be seen by the naked eye. However, the cost of such checks can be very high, and owners can only allow pets to undergo health checks every six months or a year, making it impossible for owners to immediately check whether the pet's physical condition is abnormal.

SUMMARY

In view of the above description, the present disclosure provides a physiological information sensing device and method.

The physiological information sensing device according to an embodiment of the present disclosure includes: a signal generator, an transmitting antenna, a first receiving antenna, a second receiving antenna, a signal processing circuit and a computing element. The signal processing circuit includes: a mixer, a first band pass filter and a second band pass filter. The signal generator is configured to generate a microwave signal. The transmitting antenna is connected to the signal generator configured to transmit the microwave signal. The first receiving antenna is configured to receive a first reflected signal corresponding to the microwave signal. The second receiving antenna is configured to receive a second reflected signal corresponding to the microwave signal. The mixer is connected to the signal generator, the first receiving antenna and the second receiving antenna, and is configured to integrate the first reflected signal and the second reflected signal and perform demodulation with the microwave signal to generate a demodulated signal. The first band pass filter is connected to the mixer, and is configured to filter the demodulated signal based on a first frequency domain to generate a first filtered signal. The second band pass filter is connected to the mixer, and is configured to filter the demodulated signal based on a second frequency domain to generate a second filtered signal. The computing element is connected to the first band pass filter and the second band pass filter, and is configured to output a heart rate and a respiration rate according to the first filtered signal and the second filtered signal.

The physiological information sensing method according to an embodiment of the present disclosure includes: generating, by a signal generator, a microwave signal; transmitting, by a transmitting antenna, the microwave signal; receiving, by a first receiving antenna, a first reflected signal corresponding to the microwave signal, and receiving, by a second receiving antenna, a second reflected signal corresponding to the microwave signal; integrating, by a signal processing circuit, the first reflected signal and the second reflected signal, and performing, by the signal processing circuit, demodulation with the microwave signal to generate a demodulated signal; filtering, by the signal processing circuit, the demodulated signal based on a first frequency domain to generate a first filtered signal, and filtering, by the signal processing circuit, the demodulated signal based on a second frequency domain to generate a second filtered signal; and outputting, by a computing element, a heart rate and a respiration rate according to the first filtered signal and the second filtered signal.

In view of the above, the physiological information sensing device and method according to one or more embodiments of the present disclosure may output the heart rate and the respiration rate of animals instantly, for the pet owner to be able to keep track of pet health information at any time. In addition, the physiological information sensing device and method according to one or more embodiments of the present disclosure may be applied in a non-invasive and continuous manner, wherein the physiological information sensing device may be implemented as portable wearable device, and may be used without shaving hair from the pets, which improves convenience of use.

The above description of the summary of this invention and the description of the following embodiments are provided to illustrate and explain the spirit and principles of this invention, and to provide further explanation of the scope of this invention.

DETAILED DESCRIPTION

The detailed features and advantages of this invention will be described in detail in the following description, which is intended to enable any person having ordinary skill in the art to understand the technical aspects of this invention and to practice it. In accordance with the teachings, claims and the drawings of this invention, any person having ordinary skill in the art is able to readily understand the objectives and advantages of this invention. The following embodiments illustrate this invention in further detail, but the scope of this invention is not limited by any point of view.

The physiological information sensing device according to one or more embodiments of the present disclosure described below may be installed at wearable device of animal (such as pets, livestock and poultry etc.), the wearable device is, for example, a collar, harness etc. The physiological information sensing device may also be installed at sleeping pads, clothing, etc. of animals. The physiological information sensing device is preferably located at the neck or chest of the animal to measure heart rate and respiration rate of the animal.

Figure 1:
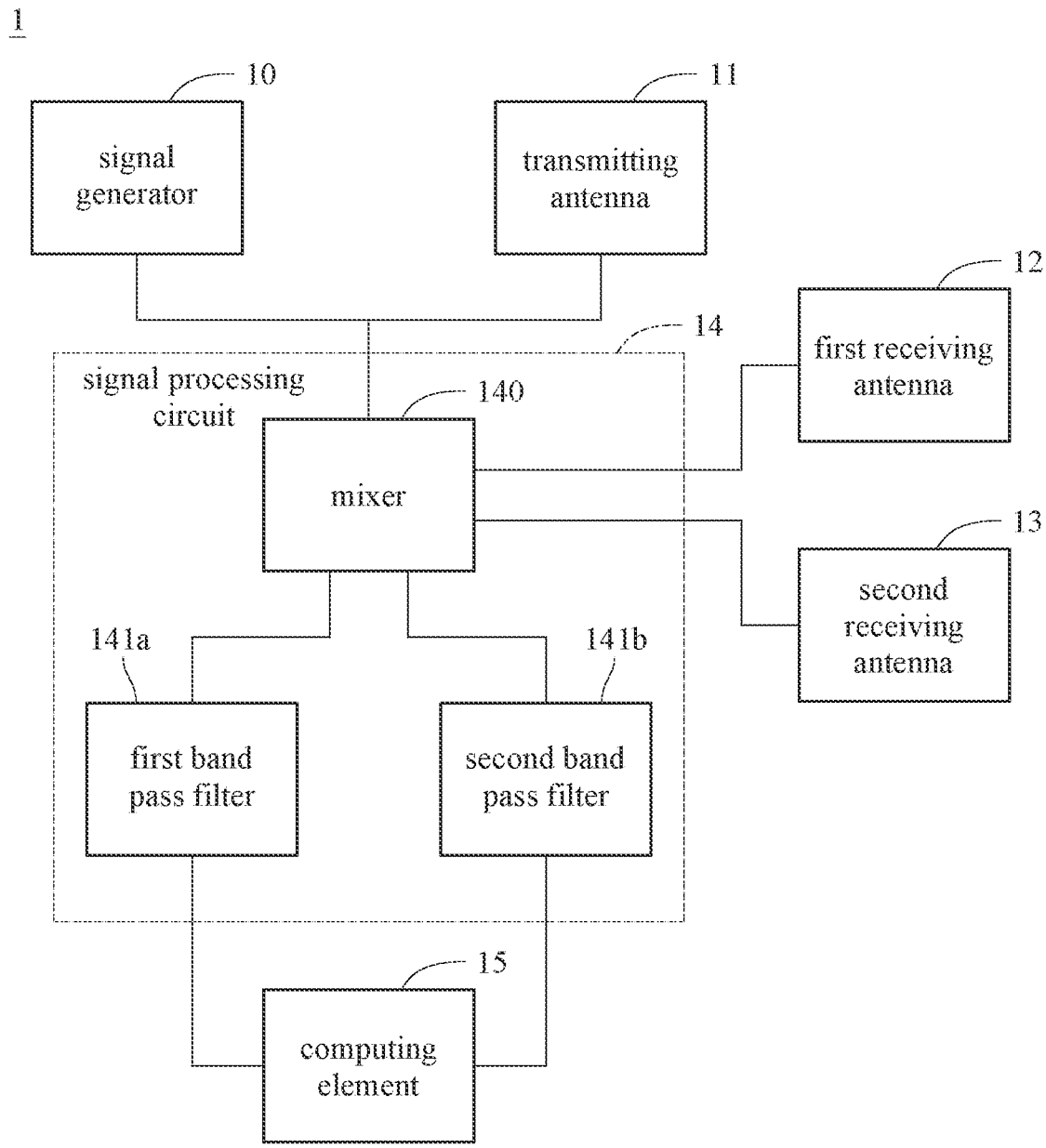
FIG. 1 is a block diagram illustrating a physiological information sensing device according to a first embodiment of the present disclosure.

Please refer to FIG. 1, FIG. 1 is a block diagram illustrating a physiological information sensing device according to a first embodiment of the present disclosure. The physiological information sensing device 1 includes a signal generator 10, a transmitting antenna 11, a first receiving antenna 12, a second receiving antenna 13, a signal processing circuit 14 and a computing element 15. The signal generator 10, the signal processing circuit 14 and the computing element 15 may be commonly connected to a power source, the signal generator 10, the signal processing circuit 14 and the computing element 15 may also have their own independent power source.

The signal generator 10 may be a radio-frequency (RF) signal generator, and is configured to generate short pulse microwave signals, such as electrical waves range from 100 MHz to 900 MHz. The transmitting antenna 11 is electrically connected to the signal generator 10, and is configured to transmit the microwave signal generated by the signal generator 10, wherein frequency of transmitting the microwave signal may be not greater than 1 GHz, the present disclosure is not limited thereto. The first receiving antenna 12 is configured to receive a first reflected signal, and the second receiving antenna 13 is configured to receive a second reflected signal.

The signal processing circuit 14 is electrically connected to the signal generator 10, the transmitting antenna 11, the first receiving antenna 12 and the second receiving antenna 13. Furthermore, the signal processing circuit 14 includes a mixer 140, a first band pass filter 141a and a second band pass filter 141b. The mixer 140 is electrically connected to an output terminal of the signal generator 10, an input terminal of the first receiving antenna 12 and an input terminal of the second receiving antenna 13. The first band pass filter 141a is electrically connected to an output terminal of the mixer 140, and the second band pass filter 141b is electrically connected to the output terminal of the mixer 140.

The computing element 15 is electrically connected to an output terminal of the first band pass filter 141a and an output terminal of the second band pass filter 141b. The computing element 15 may be configured to control operation of each element of the physiological information sensing device 1. The computing element 15 may include one or more processors, said processor is, for example, a central processing unit, a graphics processor, a microcontroller, a programmable logic controller or other processors with signal processing functions. The details of operation of the physiological information sensing device 1 are described below with reference to FIG. 3.

Figure 2A:
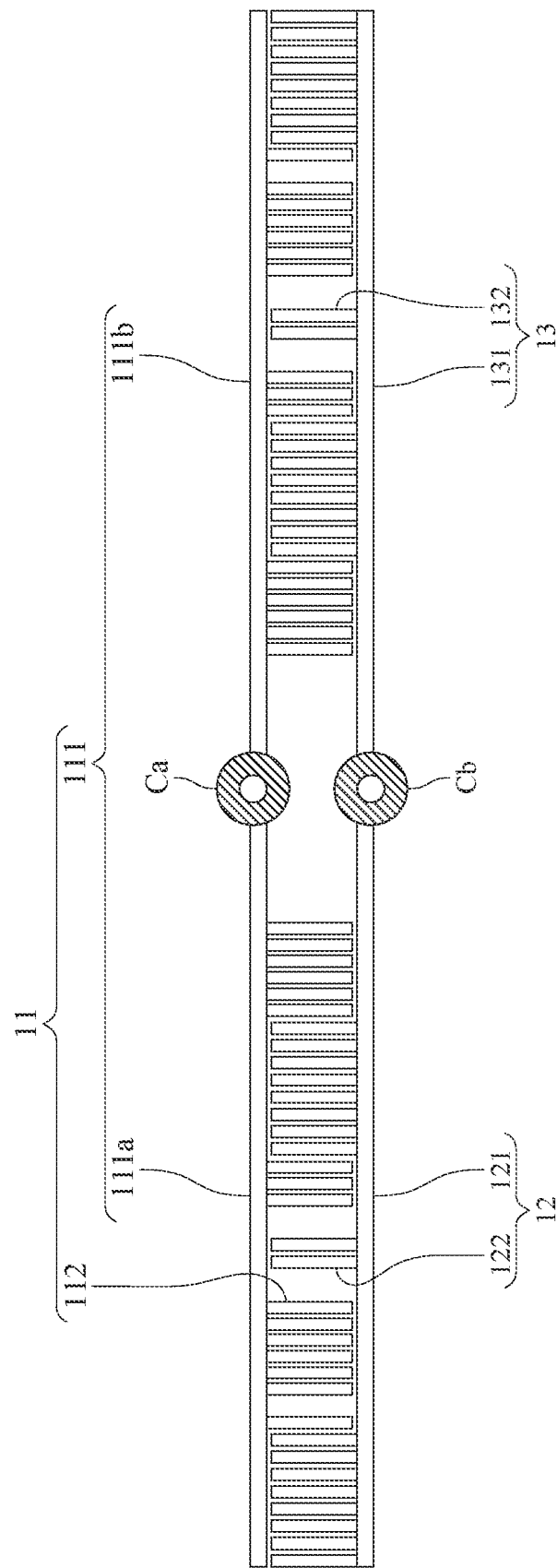
FIG. 2A and FIG. 2B are schematic diagrams illustrating a transmitting antenna, a first receiving antenna and a second receiving antenna according to an embodiment of the present disclosure.
Figure 2B:
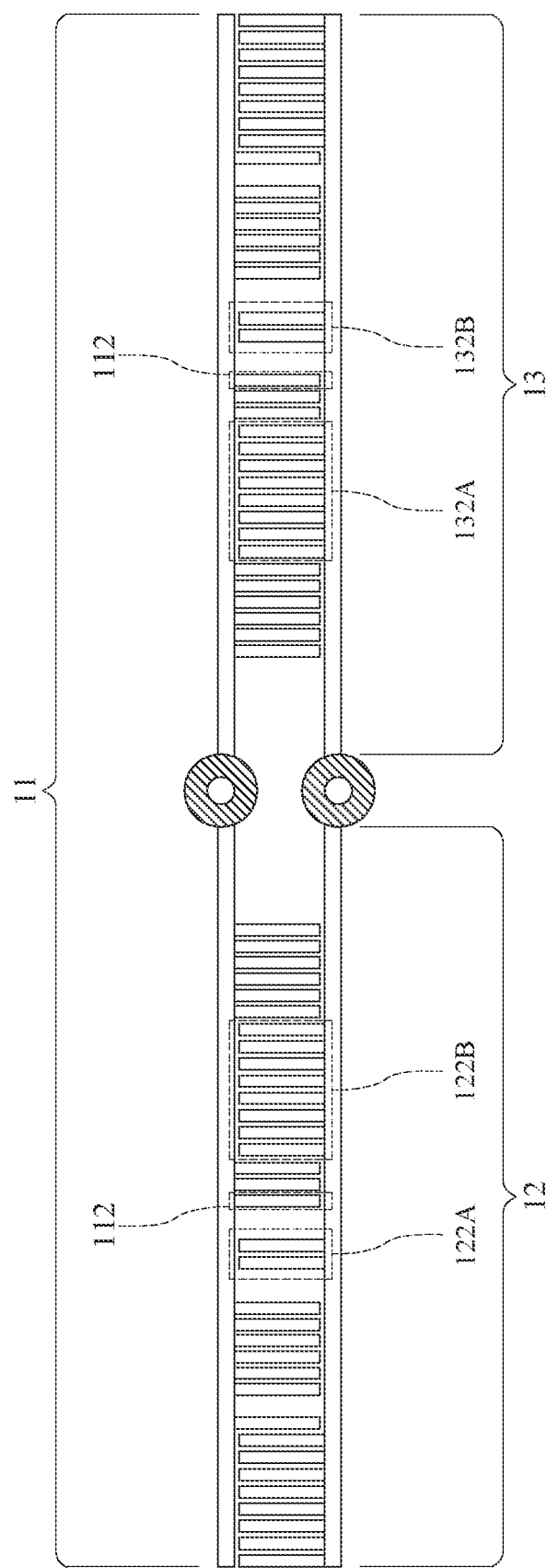

Please refer to FIG. 2A and FIG. 2B, wherein FIG. 2A and FIG. 2B are schematic diagrams illustrating a transmitting antenna, a first receiving antenna and a second receiving antenna according to an embodiment of the present disclosure. The transmitting antenna 11, the first receiving antenna 12 and the second receiving antenna 13 may all be comb-shaped electrodes, and preferably are flexible antennas. The transmitting antenna 11, the first receiving antenna 12 and the second receiving antenna 13 are preferably monopole antennas, and antenna lengths thereof may be around a quarter of the resonant wavelength. The transmitting antenna 11, the first receiving antenna 12 and the second receiving antenna 13 may be designed to have different sizes to be applied to different animals with various sizes. For example, when the subject animal is a dog, the length of each of the transmitting antenna 11, the first receiving antenna 12 and the second receiving antenna 13 may be 50 centimeters, and width may be 30 centimeters, the present disclosure is not limited thereto.

Furthermore, the transmitting antenna 11 includes a conductive part Ca, a main body part 111 and a plurality of comb-shaped parts 112. The first receiving antenna 12 includes a main body part 121 and a plurality of comb-shaped parts 122. The second receiving antenna 13 includes a main body part 131 and a plurality of comb-shaped parts 132. The first receiving antenna 12 and the second receiving antenna 13 may share one conductive part Cb.

The main body part 111 of the transmitting antenna 11 and the main body part 121 of the first receiving antenna 12 are oppositely disposed, the main body part 111 of the transmitting antenna 11 and the main body part 131 of the second receiving antenna 13 are oppositely disposed, and the main body part 111 of the transmitting antenna 11 may be parallel to the main body part 121 of the first receiving antenna 12 and the main body part 131 of the second receiving antenna 13.

The first receiving antenna 12 and the second receiving antenna 13 are symmetrical to each other. The first receiving antenna 12 and the second receiving antenna 13 are symmetrical to each other based on a connection line between the conductive part Ca and the conductive part Cb. In addition, the main body part 111 of the transmitting antenna 11 includes a first main body part 111a and a second main body part 111b, and the first main body part 111a and the second main body part 111b are symmetrical to each other. The first main body part 111a and the second main body part 111b are symmetrical to each other based on a connection line between the conductive part Ca and the conductive part Cb.

An extending direction of the comb-shaped parts 112 of the transmitting antenna 11 is perpendicular to the main body part 111, an extending direction of the comb-shaped parts 122 of the first receiving antenna 12 is perpendicular to the main body part 121, and an extending direction of the comb-shaped parts 132 of the second receiving antenna 13 is perpendicular to the main body part 131. The extending direction of the comb-shaped parts 112 is parallel to the extending direction of the comb-shaped parts 122, and the extending direction of the comb-shaped parts 112 is parallel to the extending direction of the comb-shaped parts 132.

In addition, as shown in FIG. 2B, the comb-shaped parts 122 of the first receiving antenna 12 includes a first comb-shaped group 122A and a second comb-shaped group 122B, and one of the comb-shaped parts 112 of the transmitting antenna 11 is located between the first comb-shaped group 122A and the second comb-shaped group 122B. Furthermore, the first comb-shaped group 122A includes a plurality of comb-shaped parts 122, and the second comb-shaped group 122B includes another plurality of comb-shaped parts 122, and one or more comb-shaped parts 112 are located between the first comb-shaped group 122A and the second comb-shaped group 122B.

Similarly, the comb-shaped parts 132 of the second receiving antenna 13 includes a first comb-shaped group 132A and a second comb-shaped group 132B, and one of the comb-shaped parts 112 of the transmitting antenna 11 is located between the first comb-shaped group 132A and the second comb-shaped group 132B.

Furthermore, the first comb-shaped group 132A includes a plurality of comb-shaped parts 132, and the second comb-shaped group 132B includes another plurality of comb-shaped parts 132, and one or more comb-shaped parts 112 are located between the first comb-shaped group 132A and the second comb-shaped group 132B.

The structures of the transmitting antenna 11, the first receiving antenna 12 and the second receiving antenna 13 shown in FIG. 2A and FIG. 2B may be applied to the transmitting antenna 11, the first receiving antenna 12 and the second receiving antenna 13 of FIG. 1, and may also be applied to the transmitting antenna, the first receiving antenna and the second receiving antenna of one or more embodiments described below. The transmitting antenna 11, the first receiving antenna 12 and the second receiving antenna 13 described above may take up smaller area, and since the comb-shaped structures of the transmitting antenna 11, the first receiving antenna 12 and the second receiving antenna 13 allow for the increase of the path length of the induced current, the radiation efficiency of the transmitting antenna 11, the first receiving antenna 12 and the second receiving antenna 13 may also be improved.

Figure 3:
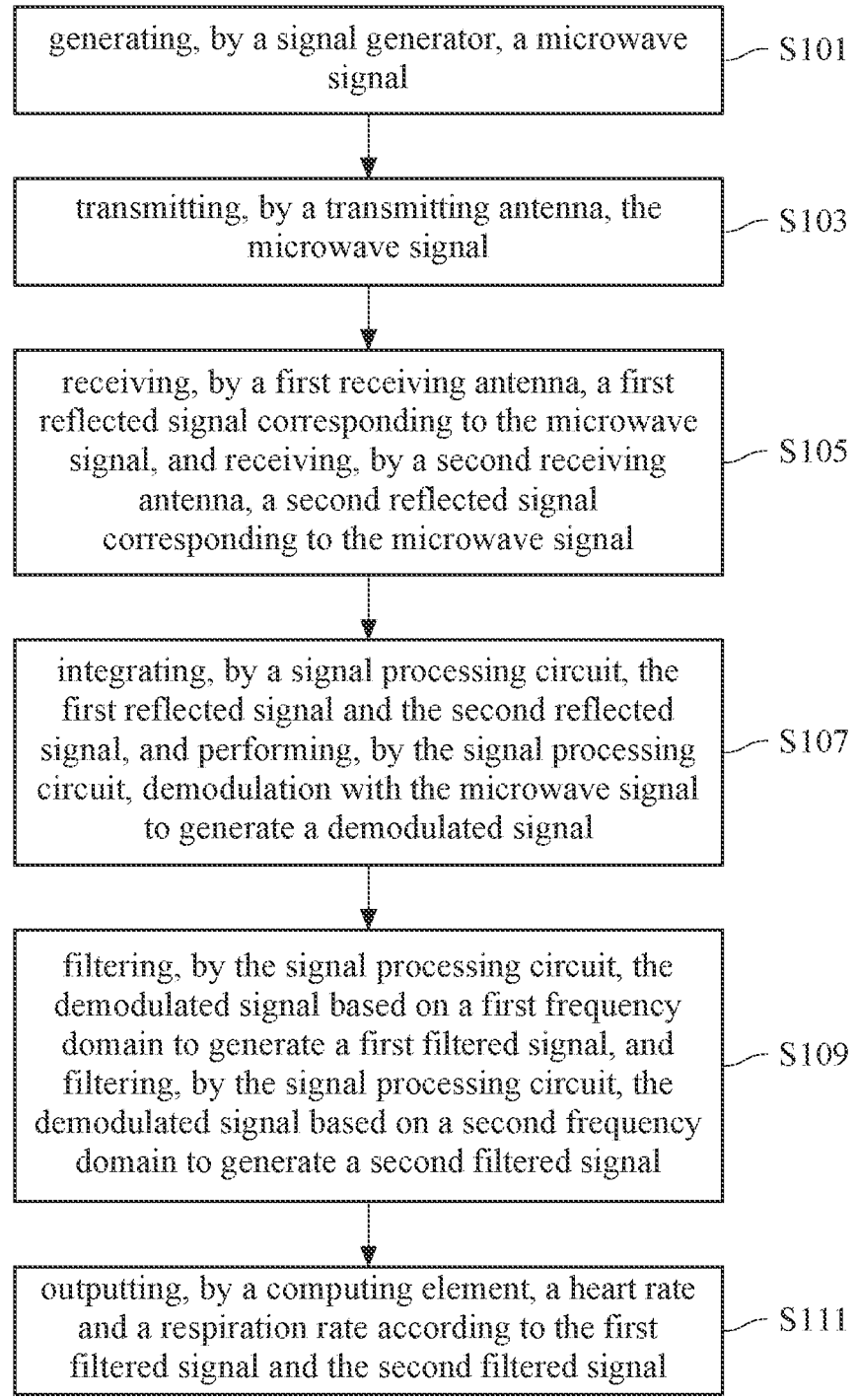
FIG. 3 is a flow chart illustrating a physiological information sensing method according to the first embodiment of the present disclosure.

Please refer to FIG. 1 and FIG. 3, wherein FIG. 3 is a flow chart illustrating a physiological information sensing method according to the first embodiment of the present disclosure. As shown in FIG. 3, the physiological information sensing method includes: step S101: generating, by a signal generator, a microwave signal; step S103: transmitting, by a transmitting antenna, the microwave signal; step S105: receiving, by a first receiving antenna, a first reflected signal corresponding to the microwave signal, and receiving, by a second receiving antenna, a second reflected signal corresponding to the microwave signal; step S107: integrating, by a signal processing circuit, the first reflected signal and the second reflected signal, and performing, by the signal processing circuit, demodulation with the microwave signal to generate a demodulated signal; step S109: filtering, by the signal processing circuit, the demodulated signal based on a first frequency domain to generate a first filtered signal, and filtering, by the signal processing circuit, the demodulated signal based on a second frequency domain to generate a second filtered signal; and step S111: outputting, by a computing element, a heart rate and a respiration rate according to the first filtered signal and the second filtered signal.

In step S101, the signal generator 10 may generate microwave signals continuously, and the signal generator 10 may output the microwave signals to the transmitting antenna 11 and the mixer 140 one by one. For example, the signal generator 10 outputs a first microwave signal to the transmitting antenna 11 at a first time point, outputs a second microwave signal to the mixer 140 at a second time point, and outputs a third microwave signal to the transmitting antenna 11 at a third time point, and so on. In other words, the signal generator 10 may generate the microwave signals continuously in a constant or non-constant time interval.

In step S103, the transmitting antenna 11 receives the microwave signal from the signal generator 10, and outputs the microwave signal to sites of animal heart or arteries.

In step S105, the first receiving antenna 12 receives the first reflected signal, wherein the first reflected signal corresponds to the microwave signal transmitted by the transmitting antenna 11; and the second receiving antenna 13 receives the second reflected signal, wherein the second reflected signal corresponds to the microwave signal transmitted by the transmitting antenna 11. In an example where the physiological information sensing device 1 is disposed at the collar, the first reflected signal is a signal reflected from the carotid artery on one side of the animal's neck, and the second reflected signal may be a signal reflected from the carotid artery on another side of the animal's neck. The first reflected signal and the second reflected signal reflect the decay of the microwave signal.

In step S107, the mixer 140 of the signal processing circuit 14 integrates the first reflected signal and the second reflected signal, and performs demodulation with the microwave signal to generate a demodulated signal, wherein the microwave signal used for the demodulation is received from the signal generator 10 (for example, the second microwave signal of the second time point described above).

In step S109, the first band pass filter 141a of the signal processing circuit 14 filters the demodulated signal generated by the mixer 140 based on the first frequency domain, and the second band pass filter 141b filters the demodulated signal based on the second frequency domain. The first frequency domain and the second frequency domain are different from each other and are preferably non-overlapping. The first frequency domain may correspond to a range of the respiration rate, the second frequency domain may correspond to a range of the heart rate, and different animals may have different first frequency domains and second frequency domains.

Figure 4:
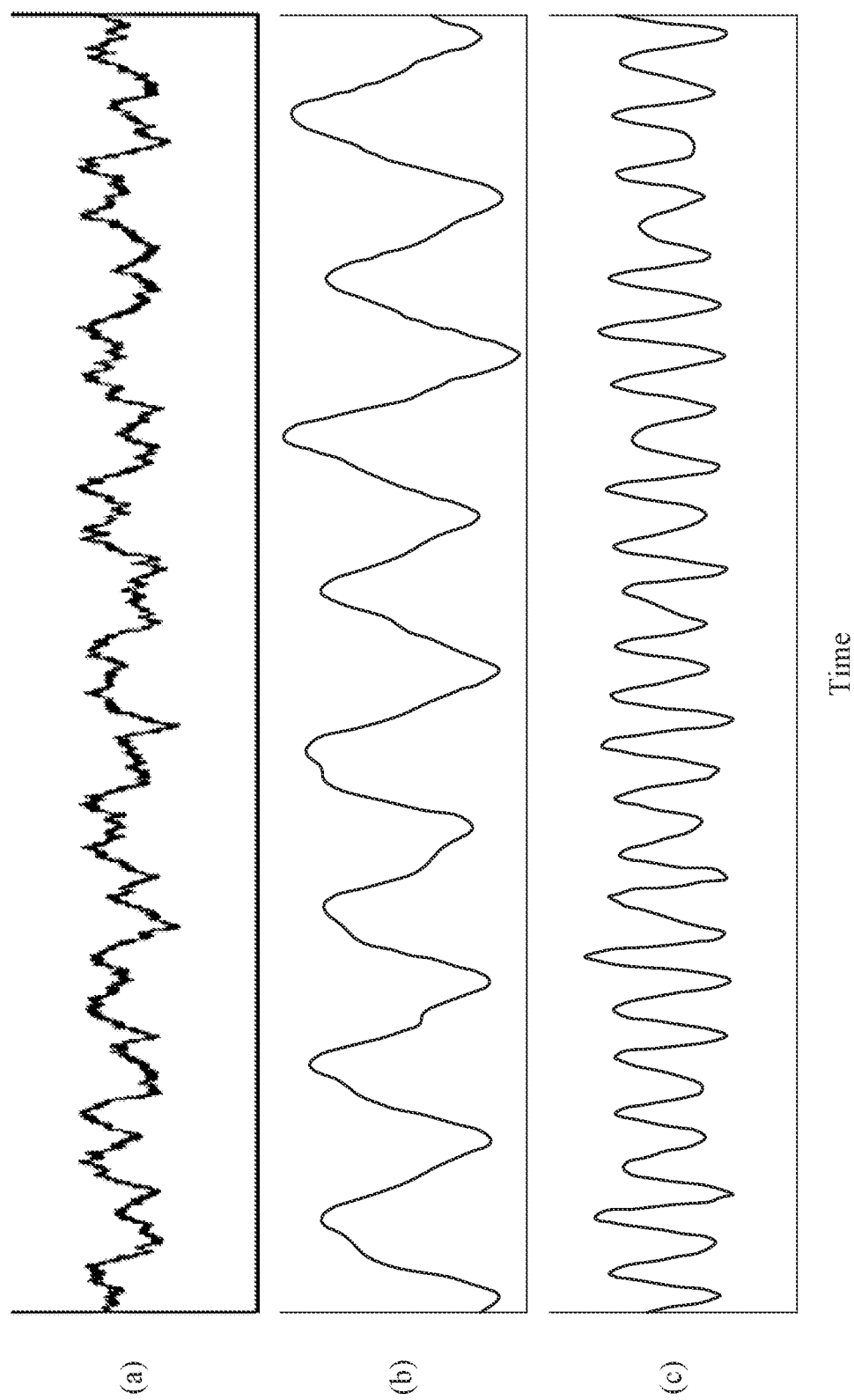
FIG. 4 is a schematic diagram illustrating the waveforms of a reflected signal, a first filtered signal and a second filtered signal.

Please refer to FIG. 4, FIG. 4 is a schematic diagram illustrating the waveforms of a reflected signal, a first filtered signal and a second filtered signal, and the experimental subject is dog. The waveform diagram (a) is the first reflected signal or the second reflected signal; the waveform diagram (b) is the first filtered signal, and corresponds to the range of the respiration rate; and the waveform diagram (c) is the second filtered signal, and corresponds to the range of the heart rate. As shown in FIG. 4, the waveform of the first filtered signal outputted by the first band pass filter 141a is regular, and matches the waveform of the respiration rate generated by using conventional technique. Similarly, the waveform of the second filtered signal outputted by the second band pass filter 141b is regular, and matches the waveform of the heart rate generated by using conventional technique.

Furthermore, for animals with higher heart rate, upper limits of the first frequency domain and the second frequency domain are also higher. The first frequency domain of cats may range from 0.4 Hz to 1.5 Hz, and the second frequency domain of cats may range from 1.5 Hz to 6 Hz; the first frequency domain of dogs may range from 0.4 Hz to 1.2 Hz, and the second frequency domain of dogs may range from 1 Hz to 5 Hz; the first frequency domain of human may range from 0.1 Hz to 0.6 Hz, and the second frequency domain of human may range from 0.8 Hz to 4 Hz. The ranges of the frequency domains are merely examples, the present disclosure is not limited thereto.

Please refer back to FIG. 3, in step S111, the computing element 15 calculates and outputs the heart rate according to the first filtered signal, and calculates and outputs the respiration rate according to the second filtered signal.

Through the physiological information sensing device and method of the above embodiments, the heart rate and the respiration rate of animals may be instantly outputted, for the pet owner to be able to keep track of pet health information at any time.

Figure 5:
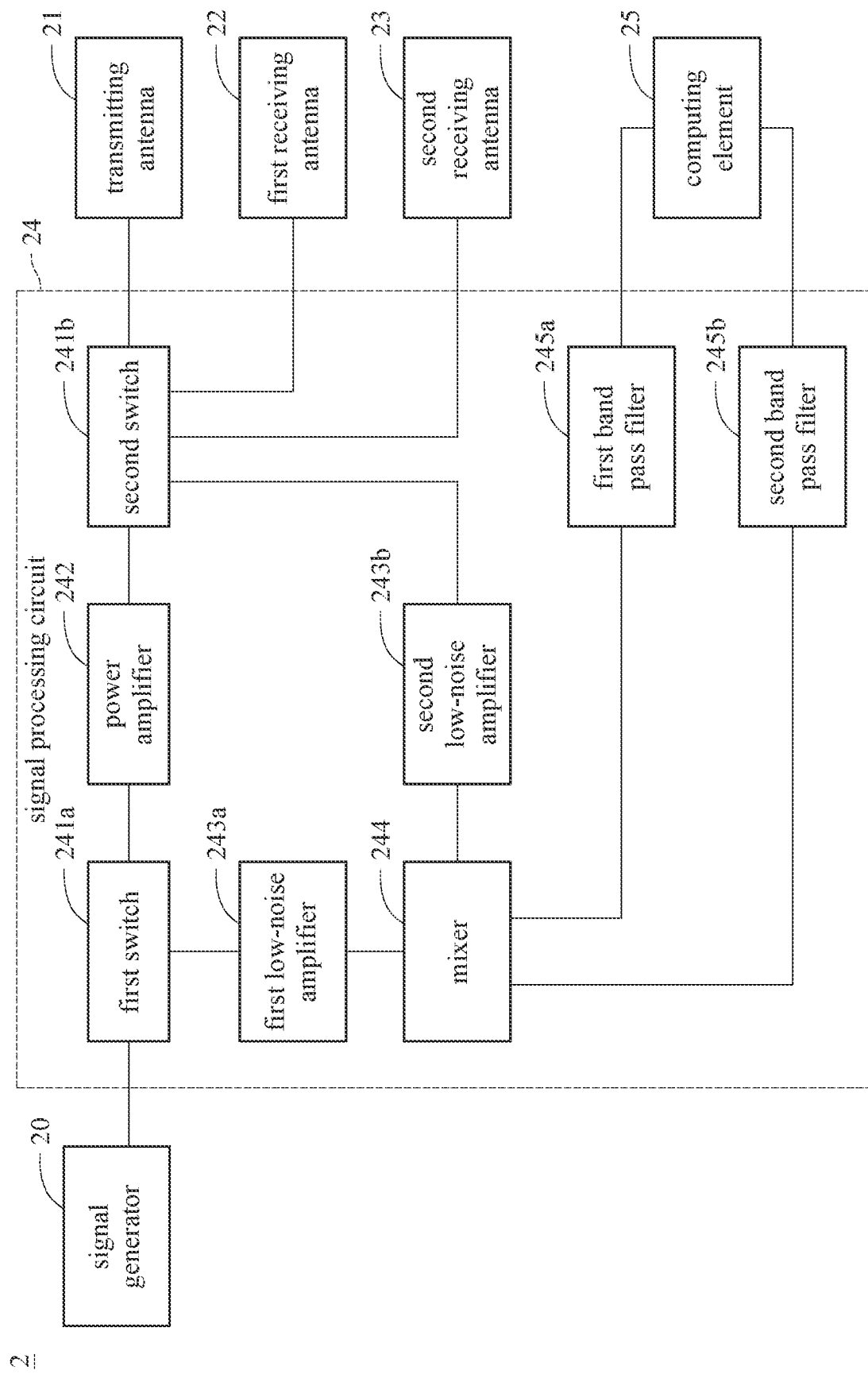
FIG. 5 is a block diagram illustrating a physiological information sensing device according to a second embodiment of the present disclosure.
Figure 6:
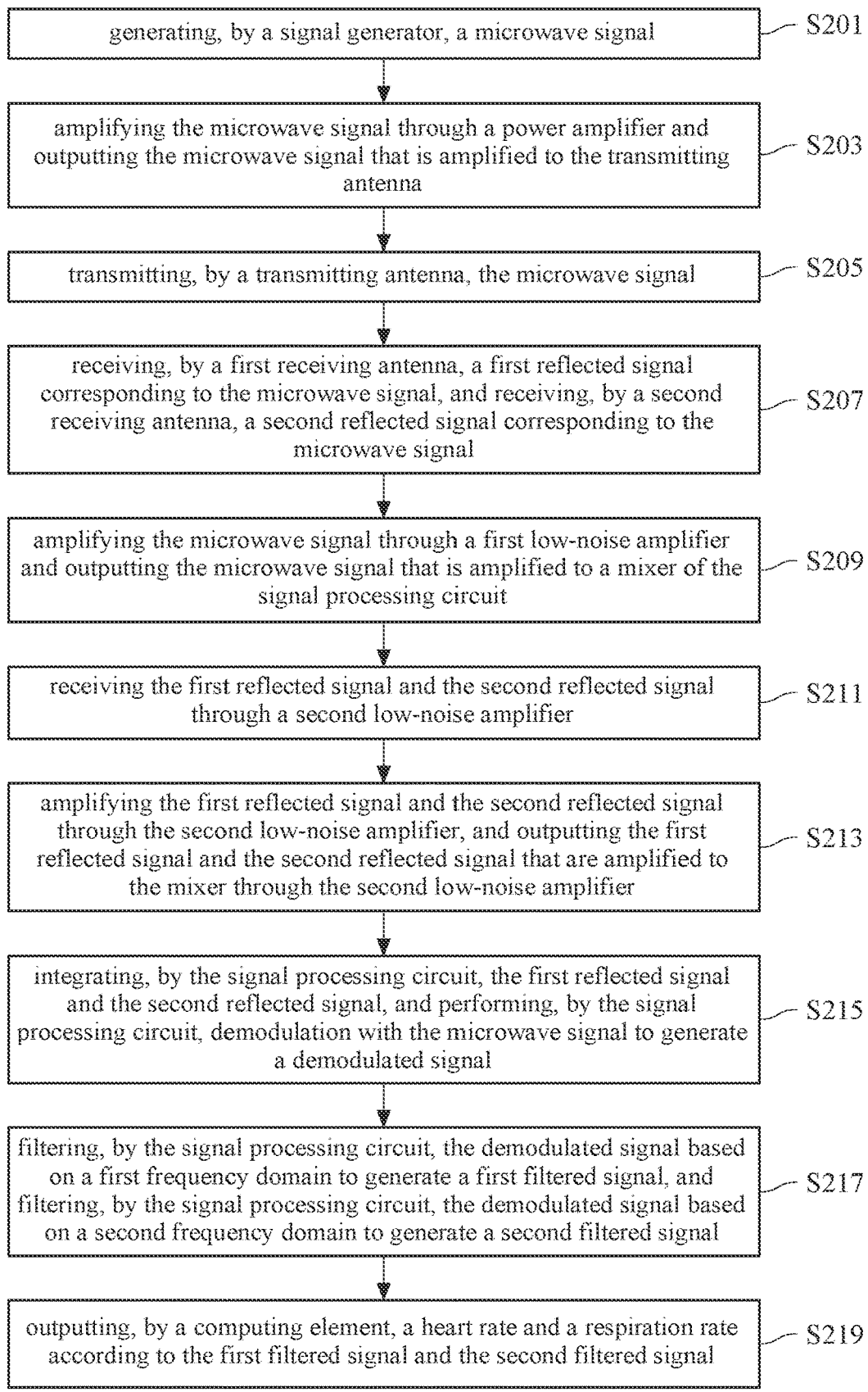
FIG. 6 is a flow chart illustrating a physiological information sensing method according to the second embodiment of the present disclosure.

Please refer to FIG. 5 and FIG. 6, wherein FIG. 5 is a block diagram illustrating a physiological information sensing device according to a second embodiment of the present disclosure, and FIG. 6 is a flow chart illustrating a physiological information sensing method according to the second embodiment of the present disclosure. The physiological information sensing device 2 shown in FIG. 5 includes a signal generator 20, a transmitting antenna 21, a first receiving antenna 22, a second receiving antenna 23, a signal processing circuit 24 and a computing element 25. The signal processing circuit 24 includes a first switch 241a, a second switch 241b, a power amplifier 242, a first low-noise amplifier 243a, a second low-noise amplifier 243b, a mixer 244, a first band pass filter 245a and a second band pass filter 245b. The signal generator 20, the transmitting antenna 21, the first receiving antenna 22, the second receiving antenna 23 and the computing element 25 of the physiological information sensing device 2 are the same as the signal generator 10, the transmitting antenna 11, the first receiving antenna 12, the second receiving antenna 13 and the computing element 15 of the physiological information sensing device 1 in FIG. 1, respectively; and the mixer 244, the first band pass filter 245a and the second band pass filter 245b of the signal processing circuit 24 are the same as the mixer 140, the first band pass filter 141a and the second band pass filter 141b of the signal processing circuit 14 in FIG. 1, respectively.

The first switch 241a is connected between the signal generator 20 and the power amplifier 242, is connected between the signal generator 20 and the first low-noise amplifier 243a, and is configured to be controlled to output the microwave signal to the power amplifier 242 or the first low-noise amplifier 243a. The second switch 241b is connected between the power amplifier 242 and the second low-noise amplifier 243b, is connected between the first receiving antenna 22 and the second low-noise amplifier 243b, and is connected between the second receiving antenna 23 and the second low-noise amplifier 243b. The second switch 241b is configured to be controlled to transmit the microwave signal that is amplified to the transmitting antenna 21, or transmit the first reflected signal and the second reflected signal that are amplified to the mixer 244. The first low-noise amplifier 243a is connected to the mixer 244, and is connected to the signal generator 20 through the first switch 241a. The second low-noise amplifier 243b is connected to the mixer 244.

As shown in FIG. 6, the physiological information sensing method according to second embodiment of the present disclosure includes: step S201: generating, by a signal generator, a microwave signal; step S203: amplifying the microwave signal by a power amplifier and outputting the microwave signal that is amplified to the transmitting antenna; step S205: transmitting, by a transmitting antenna, the microwave signal; step S207: receiving, by a first receiving antenna, a first reflected signal corresponding to the microwave signal, and receiving, by a second receiving antenna, a second reflected signal corresponding to the microwave signal; step S209: amplifying the microwave signal through a first low-noise amplifier and outputting the microwave signal that is amplified to a mixer of the signal processing circuit; step S211: receiving the first reflected signal and the second reflected signal through a second low-noise amplifier; step S213: amplifying the first reflected signal and the second reflected signal through the second low-noise amplifier, and outputting the first reflected signal and the second reflected signal that are amplified to the mixer through the second low-noise amplifier; step S215: integrating, by a signal processing circuit, the first reflected signal and the second reflected signal, and performing, by the signal processing circuit, demodulation with the microwave signal to generate a demodulated signal; step S217: filtering, by the signal processing circuit, the demodulated signal based on a first frequency domain to generate a first filtered signal, and filtering, by the signal processing circuit, the demodulated signal based on a second frequency domain to generate a second filtered signal; and step S219: outputting, by a computing element, a heart rate and a respiration rate according to the first filtered signal and the second filtered signal. Steps S201, S205, S207, S215, S217 and S219 shown in FIG. 6 are the same as steps S101, S103, S105, S107, S109 and S111 shown in FIG. 3, and their descriptions are not repeated herein.

In step S203, the first switch 241a causes conduction between the signal generator 20 and the power amplifier 242, for the power amplifier 242 to amplify the microwave signal coming from the signal generator 20, and to output the microwave signal that is amplified to the transmitting antenna 21.

In step S209, the first switch 241a causes conduction between the signal generator 20 and the first low-noise amplifier 243a, for the first low-noise amplifier 243a to amplify the microwave signal coming from the signal generator 20, and to output the microwave signal that is amplified to the mixer 244.

In step S211, the second switch 241b causes conduction between the first receiving antenna 22 and the second low-noise amplifier 243b to receive the first reflected signal, and causes conduction between the second receiving antenna 23 and the second low-noise amplifier 243b to receive the second reflected signal, the present disclosure does not limit the order of the second switch 241b causing the conduction between the first receiving antenna 22 and the second low-noise amplifier 243b and between the second receiving antenna 23 and the second low-noise amplifier 243b.

In step S213, the second low-noise amplifier 243b amplifies the first reflected signal and the second reflected signal, and transmits the first reflected signal and the second reflected signal that are amplified to the mixer 244.

The computing element 25 may control the switch of the first switch 241a to transmit the microwave signals to the power amplifier 242 and the first low-noise amplifier 243a, respectively. Similarly, the computing element 25 may control the switch of the second switch 241b to transmit the microwave signal to the transmitting antenna 24, and to transmit the reflected signals from the first receiving antenna 22/the second receiving antenna 23 to the second low-noise amplifier 243b. it should be noted that, the present disclosure does not limit the time point of performing step S209, as long as step S209 is performed after step S201 and before step S215.

Figure 7:
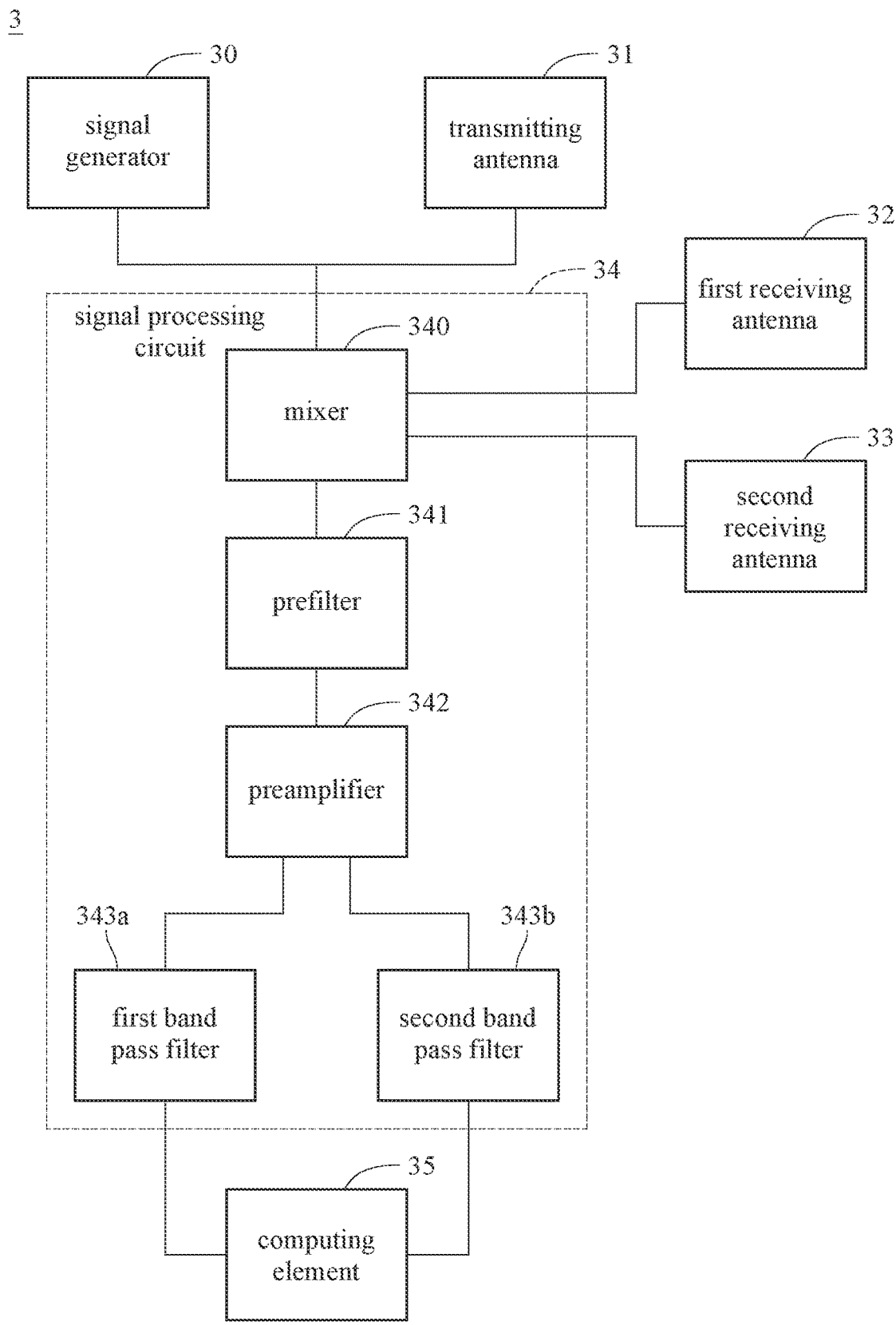
FIG. 7 is a block diagram illustrating a physiological information sensing device according to a third embodiment of the present disclosure.
Figure 8:
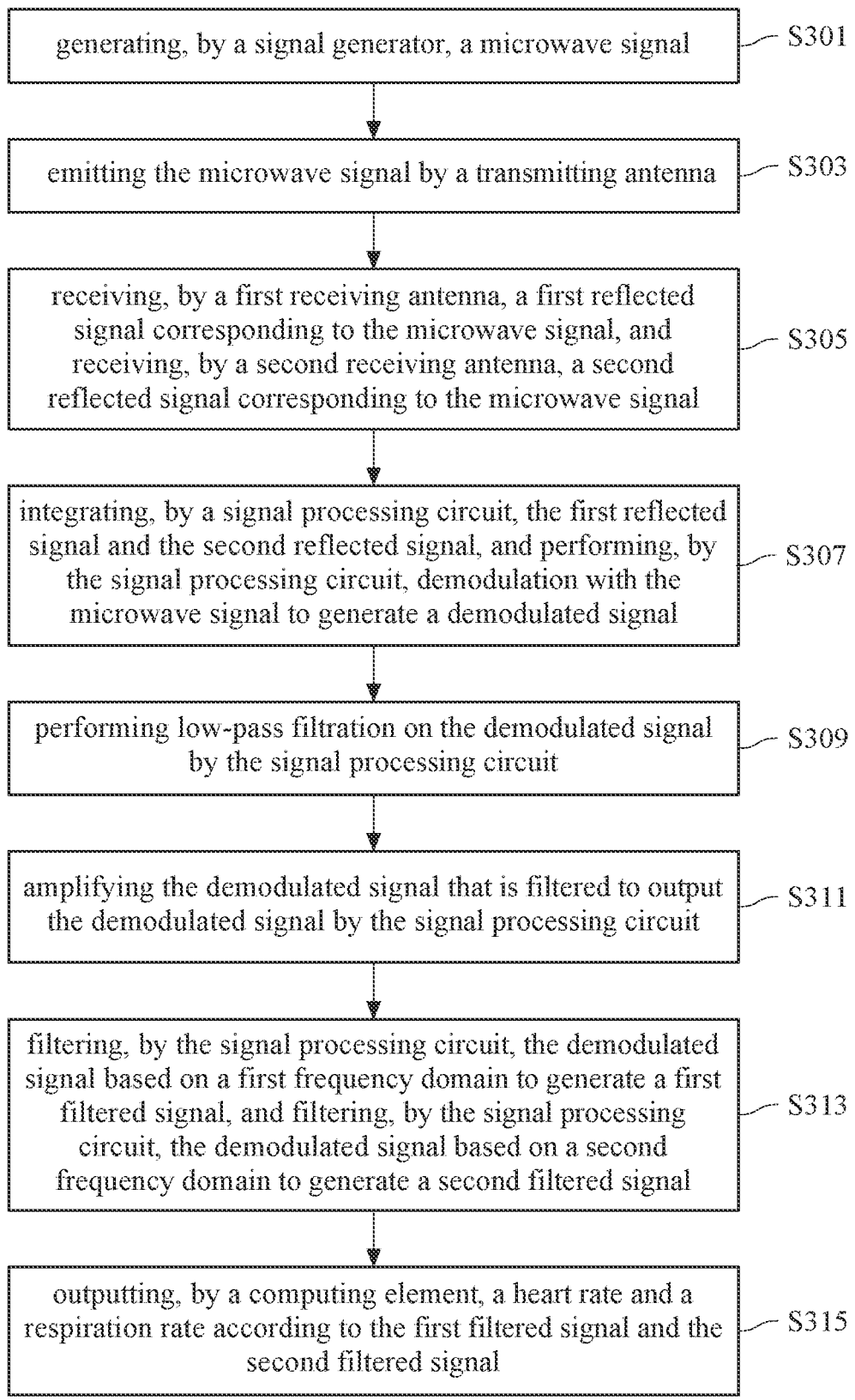
FIG. 8 is a flow chart illustrating a physiological information sensing method according to the third embodiment of the present disclosure.

Please refer to FIG. 7 and FIG. 8, wherein FIG. 7 is a block diagram illustrating a physiological information sensing device according to a third embodiment of the present disclosure, and FIG. 8 is a flow chart illustrating a physiological information sensing method according to the third embodiment of the present disclosure. The physiological information sensing device 3 shown in FIG. 7 includes a signal generator 30, a transmitting antenna 31, a first receiving antenna 32, a second receiving antenna 33, a signal processing circuit 34 and a computing element 35. The signal processing circuit 34 includes a mixer 340, a prefilter 341 (or may be referred as a passive filter), a preamplifier 342, a first band pass filter 343a and a second band pass filter 343b. The prefilter 341 is electrically connected to an output terminal of the mixer 340, the preamplifier 342 is electrically connected to an output terminal of the prefilter 341. An input terminal of the first band pass filter 343a is electrically connected to an output terminal of the preamplifier 342, and an input terminal of the second band pass filter 343b is electrically connected to the output terminal of the preamplifier 342.

The signal generator 30, the transmitting antenna 31, the first receiving antenna 32, the second receiving antenna 33 and the computing element 35 of the physiological information sensing device 3 are the same as the signal generator 10, the transmitting antenna 11, the first receiving antenna 12, the second receiving antenna 13 and the computing element 15 of the physiological information sensing device 1 in FIG. 1, respectively; the mixer 340, the first band pass filter 343a and the second band pass filter 343b of the signal processing circuit 34 are the same as the mixer 140, the first band pass filter 141a and the second band pass filter 141b of the signal processing circuit 14 in FIG. 1, respectively.

As shown in FIG. 8, the physiological information sensing method according to the third embodiment of the present disclosure includes: step S301: generating, by a signal generator, a microwave signal; step S303: transmitting, by a transmitting antenna, the microwave signal; step S305: receiving, by a first receiving antenna, a first reflected signal corresponding to the microwave signal, and receiving, by a second receiving antenna, a second reflected signal corresponding to the microwave signal; step S307: integrating, by a signal processing circuit, the first reflected signal and the second reflected signal, and performing, by the signal processing circuit, demodulation with the microwave signal to generate a demodulated signal; step S309: performing low-pass filtration on the demodulated signal by the signal processing circuit; step S311: amplifying the demodulated signal that is filtered to output the demodulated signal by the signal processing circuit; step S313: filtering, by the signal processing circuit, the demodulated signal based on a first frequency domain to generate a first filtered signal, and filtering, by the signal processing circuit, the demodulated signal based on a second frequency domain to generate a second filtered signal; and step S315: outputting, by a computing element, a heart rate and a respiration rate according to the first filtered signal and the second filtered signal. Steps S301, S303, S305, S307, S313 and S315 shown in FIG. 8 are the same as steps S101, S103, S105, S107, S109 and S111 shown in FIG. 3, and their descriptions are not repeated herein.

In step S309, the prefilter 341 of the signal processing circuit 34 performs low-pass filtration on the demodulated signal generated by the mixer 340. In step S311, the preamplifier 342 of the signal processing circuit 34 amplifies the demodulated signal that is filtered by the prefilter 341, and outputs the demodulated signal that is amplified to the first band pass filter 343a and the second band pass filter 343b.

Figure 9:
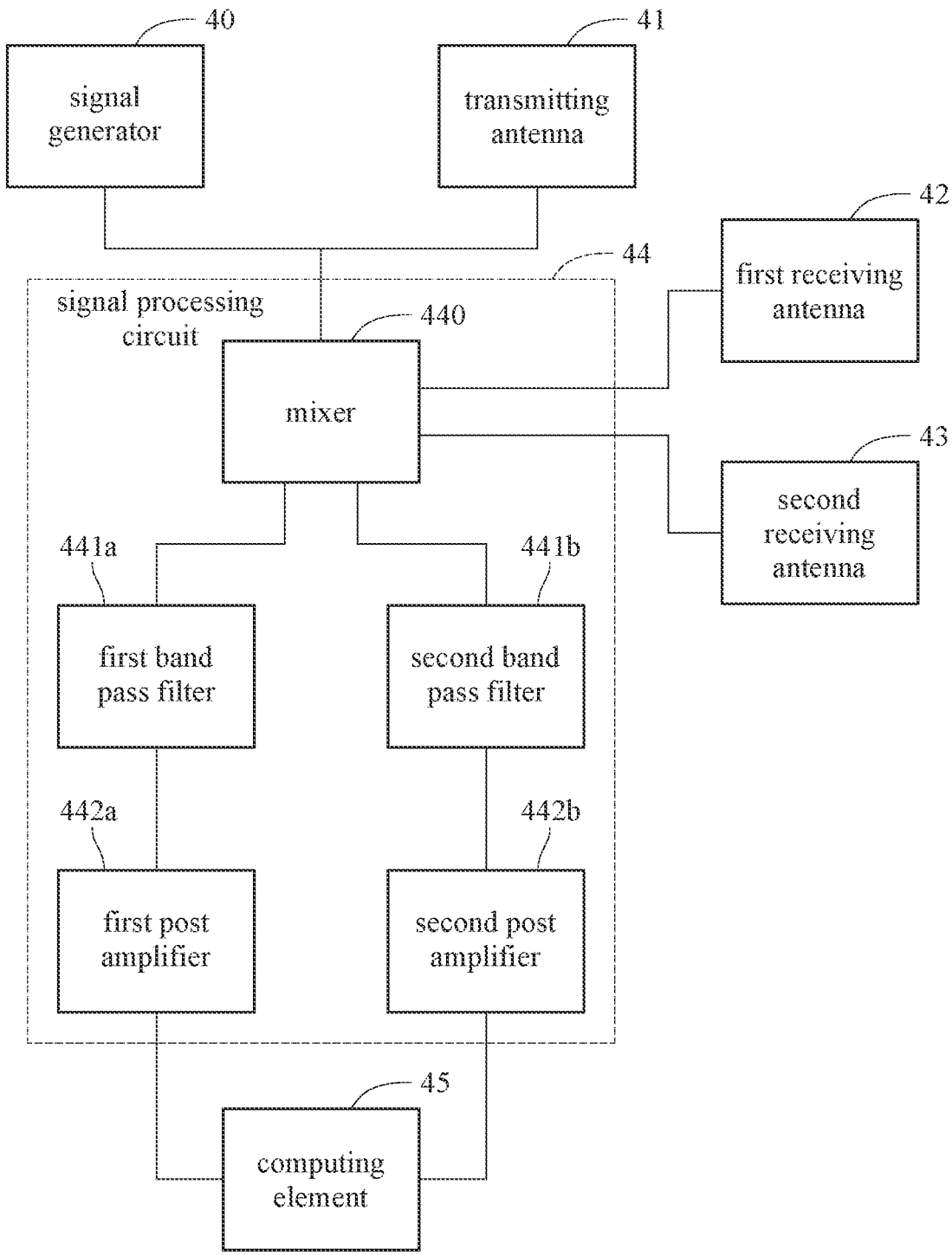
FIG. 9 is a block diagram illustrating a physiological information sensing device according to a fourth embodiment of the present disclosure.
Figure 10:
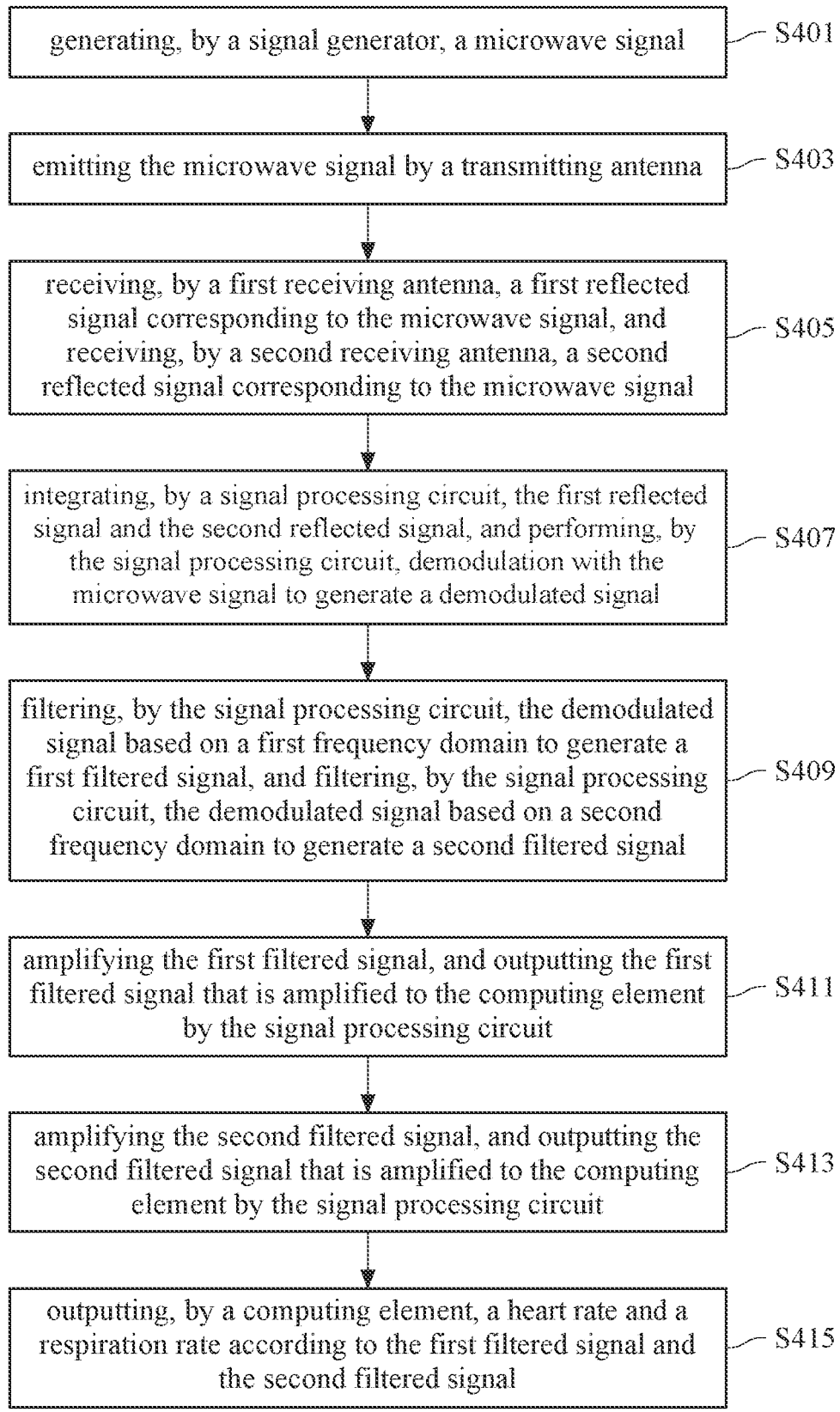
FIG. 10 is a flow chart illustrating a physiological information sensing method according to the fourth embodiment of the present disclosure.

Please refer to FIG. 9 and FIG. 10, wherein FIG. 9 is a block diagram illustrating a physiological information sensing device according to a fourth embodiment of the present disclosure, and FIG. 10 is a flow chart illustrating a physiological information sensing method according to the fourth embodiment of the present disclosure. The physiological information sensing device 4 shown in FIG. 9 includes a signal generator 40, a transmitting antenna 41, a first receiving antenna 42, a second receiving antenna 43, a signal processing circuit 44 and a computing element 45. The signal processing circuit 44 includes a mixer 440, a first band pass filter 441a, a second band pass filter 441b, a first post amplifier 442a and a second post amplifier 442b. The signal generator 40, the transmitting antenna 41, the first receiving antenna 42, the second receiving antenna 43 and the computing element 45 of the physiological information sensing device 4 are the same as the signal generator 10, the transmitting antenna 11, the first receiving antenna 12, the second receiving antenna 13 and the computing element 15 of the physiological information sensing device 1 in FIG. 1, respectively; the mixer 440, the first band pass filter 441a and the second band pass filter 441b of the signal processing circuit 44 are the same as the mixer 140, the first band pass filter 141a and the second band pass filter 141b of the signal processing circuit 14 in FIG. 1, respectively.

The first post amplifier 442a is electrically connected to an output terminal of the first band pass filter 441a and the computing element 45, and the second post amplifier 442b is electrically connected to an output terminal of the second band pass filter 441b and the computing element 45.

As shown in FIG. 10, the physiological information sensing method according to fourth embodiment of the present disclosure includes: step S401: generating, by a signal generator, a microwave signal; step S403: transmitting, by a transmitting antenna, the microwave signal; step S405: receiving, by a first receiving antenna, a first reflected signal corresponding to the microwave signal, and receiving, by a second receiving antenna, a second reflected signal corresponding to the microwave signal; step S407: integrating, by a signal processing circuit, the first reflected signal and the second reflected signal, and performing, by the signal processing circuit, demodulation with the microwave signal to generate a demodulated signal; step S409: filtering, by the signal processing circuit, the demodulated signal based on a first frequency domain to generate a first filtered signal, and filtering, by the signal processing circuit, the demodulated signal based on a second frequency domain to generate a second filtered signal; step S411: amplifying the first filtered signal, and outputting the first filtered signal that is amplified to the computing element by the signal processing circuit; step S413: amplifying the second filtered signal, and outputting the second filtered signal that is amplified to the computing element by the signal processing circuit; and step S415: outputting, by a computing element, a heart rate and a respiration rate according to the first filtered signal and the second filtered signal. Steps S401, S403, S405, S407, S409 and S415 shown in FIG. 10 are the same as steps S101, S103, S105, S107, S109 and S111 shown in FIG. 3, and their descriptions are not repeated herein.

In step S411, the first post amplifier 442a of the signal processing circuit 44 amplifies the first filtered signal outputted by the first band pass filter 441a; and in step S413, the second post amplifier 442b of the signal processing circuit 44 amplifies the second filtered signal outputted by the second band pass filter 441b. Then, in step S415, the computing element calculates the heart rate and the respiration rate based on the first filtered signal that is amplified and outputted by the first post amplifier 442a, and the second filtered signal that is amplified and outputted by the second post amplifier 442b.

Figure 11:
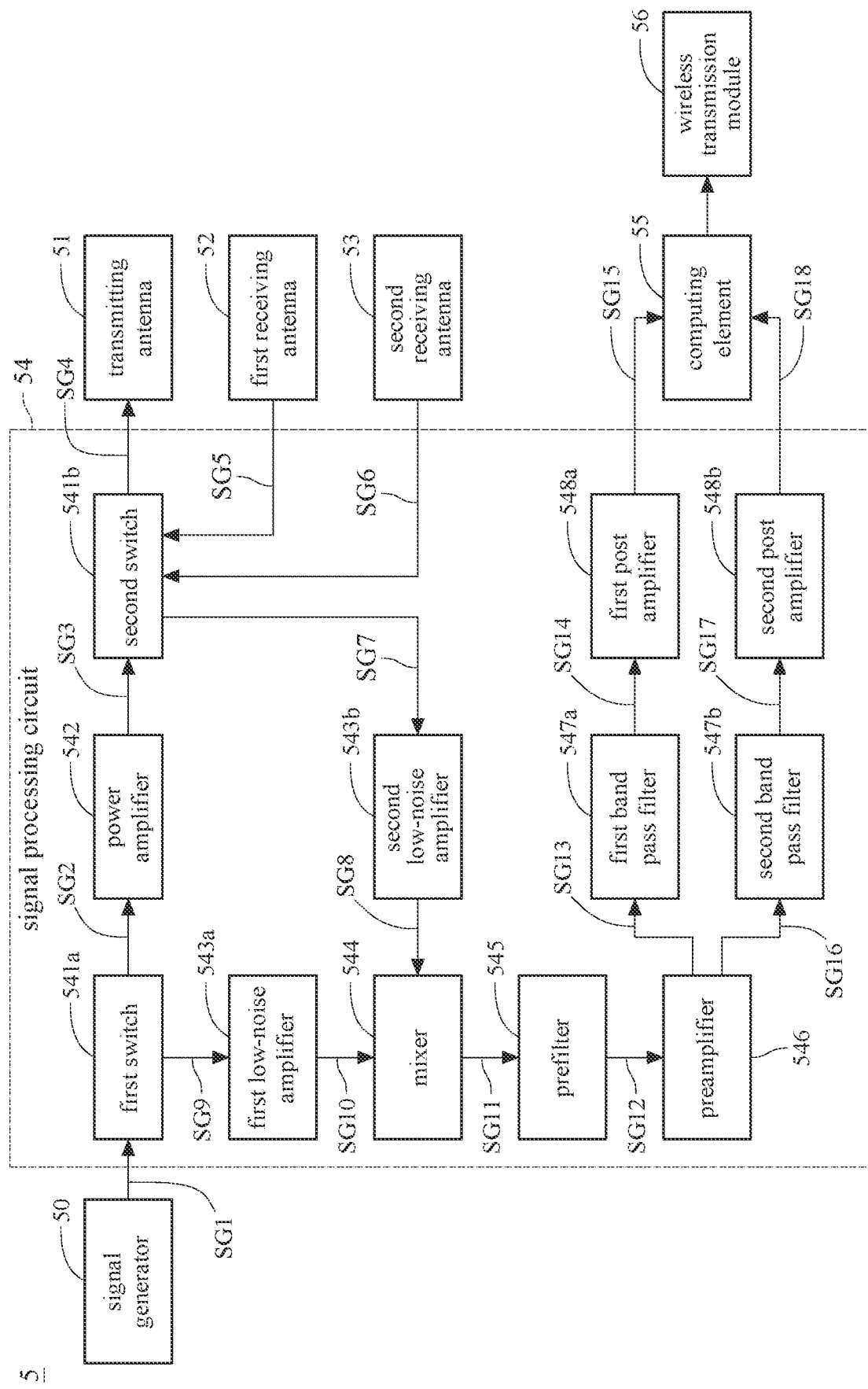
FIG. 11 is a block diagram illustrating a physiological information sensing device according to a fifth embodiment of the present disclosure.

Please refer to FIG. 11, FIG. 11 is a block diagram illustrating a physiological information sensing device according to a fifth embodiment of the present disclosure. The physiological information sensing device 5 includes a signal generator 50, a transmitting antenna 51, a first receiving antenna 52, a second receiving antenna 53, a signal processing circuit 54, a computing element 55 and a wireless transmission module 56. The signal generator 50, the transmitting antenna 51, the first receiving antenna 52, the second receiving antenna 53 and the computing element 55 are the same as the signal generator, the transmitting antenna, the first receiving antenna, the second receiving antenna and the computing element of the first embodiment to the fourth embodiment. The mixer 544, the first band pass filter 547a and the second band pass filter 547b of the signal processing circuit 54 are the same as the mixer, the first band pass filter and the second band pass filter of the first embodiment to the fourth embodiment. The wireless transmission module 56 may be a Bluetooth component, a radio frequency identification tag component, a Wifi component or other components that can be used for data transmission.

The signal processing circuit 54 includes a first switch 541a, a second switch 541b, a power amplifier 542, a first low-noise amplifier 543a, a second low-noise amplifier 543b, a mixer 544, a prefilter 545, a preamplifier 546, a first band pass filter 547a, a second band pass filter 547b, a first post amplifier 548a and a second post amplifier 548b. The first switch 541a, the second switch 541b, the power amplifier 542, the first low-noise amplifier 543a and the second low-noise amplifier 543b may be the same as that of the second embodiment; the prefilter 545 and the preamplifier 546 may be the same as that of the third embodiment; the first post amplifier 548a and the second post amplifier 548b may be the same as that of the fourth embodiment The following describes the operation of the physiological information sensing device 5. The signal generator 50 generates the microwave signal SG1. When the first switch 541a causes conduction between the signal generator 50 and the power amplifier 542, the microwave signal SG1 passes through the first switch 541a as the microwave signal SG2 inputted into the power amplifier 542. The power amplifier 542 amplifies the microwave signal SG2 to output the amplified microwave signal SG3. When the second switch 541b causes conduction between the power amplifier 542 and the transmitting antenna 51, the microwave signal SG3 passes through the second switch 541b as the microwave signal SG4 transmitted to the transmitting antenna 51, and the transmitting antenna 51 transmits the microwave signal SG4.

The first receiving antenna 52 receives the first reflected signal SG5 corresponding to the microwave signal SG4, and the second receiving antenna 53 receives the second reflected signal SG6 corresponding to the microwave signal SG4. When the second switch 541b causes conduction between the first receiving antenna 52 and the second low-noise amplifier 543b, the first reflected signal SG5 is inputted to the second low-noise amplifier 543b as the reflected signal SG7; and when the second switch 541b causes conduction between the second receiving antenna 53 and the second low-noise amplifier 543b, the second reflected signal SG6 is inputted to the second low-noise amplifier 543b as the reflected signal SG7. In other words, the reflected signal SG7 may include the first reflected signal SG5 and the second reflected signal SG6. The second low-noise amplifier 543b amplifies the reflected signal SG7, and inputs the amplified reflected signal SG7 as the reflected signal SG8 to the mixer 544.

On the other hand, when the first switch 541a causes conduction between the signal generator 50 and the first low-noise amplifier 543a, the microwave signal SG1 passes through the first switch 541a as the microwave signal SG9 inputted to the first low-noise amplifier 543a. The first low-noise amplifier 543a amplifies the microwave signal SG9 to output the amplified microwave signal SG10 to the mixer 544. It should be noted that, the microwave signal SG2 and the microwave signal SG9 are preferably signals with the exact same frequency, phase and amplitude. The difference between the microwave signal SG2 and the microwave signal SG9 is that, the time point of the signal generator 50 generating one of the microwave signal SG2 and the microwave signal SG9 is later than the time point of generating the other.

After the mixer 544 receives the reflected signal SG8 and the microwave signal SG10, the mixer 544 integrates the reflected signal SG8 (i.e. the first reflected signal SG5 and the second reflected signal SG6), and performs the demodulation based on the microwave signal SG10 and the mixed reflected signal SG8 to generate the demodulated signal SG11.

Then, the prefilter 545 performs pre-filtration (passive filtration) on the demodulated signal SG11 to generate the filtered demodulated signal SG12. The preamplifier 546 amplifies the demodulated signal SG12 to generate the demodulated signals SG13 and SG14 that are amplified, and the demodulated signals SG13 and SG14 are inputted to the first band pass filter 547a and the second band pass filter 547b, respectively. The first band pass filter 547a performs band pass filtration on the demodulated signal SG13 based on the first frequency domain to generate the first filtered signal SG14 that is inputted into the first post amplifier 548a. The first post amplifier 548a amplifies the first filtered signal SG14 to generate and output the amplified first filtered signal SG15 to the computing element 55. Similarly, the second band pass filter 547b performs band pass filtration on the demodulated signal SG16 based on the second frequency domain to generate the second filtered signal SG17 that is inputted to the second post amplifier 548b. The second post amplifier 548b amplifies the second filtered signal SG17 to generate the amplified second filtered signal SG18 that is inputted to the computing element 55. Then, the computing element 55 calculates the heart rate and the respiration rate according to the first filtered signal SG15 and the second filtered signal SG17, and may output the heart rate and the respiration rate to a remote monitor (for example, electronic device of a user) through the wireless transmission module 56.

Figure 12:
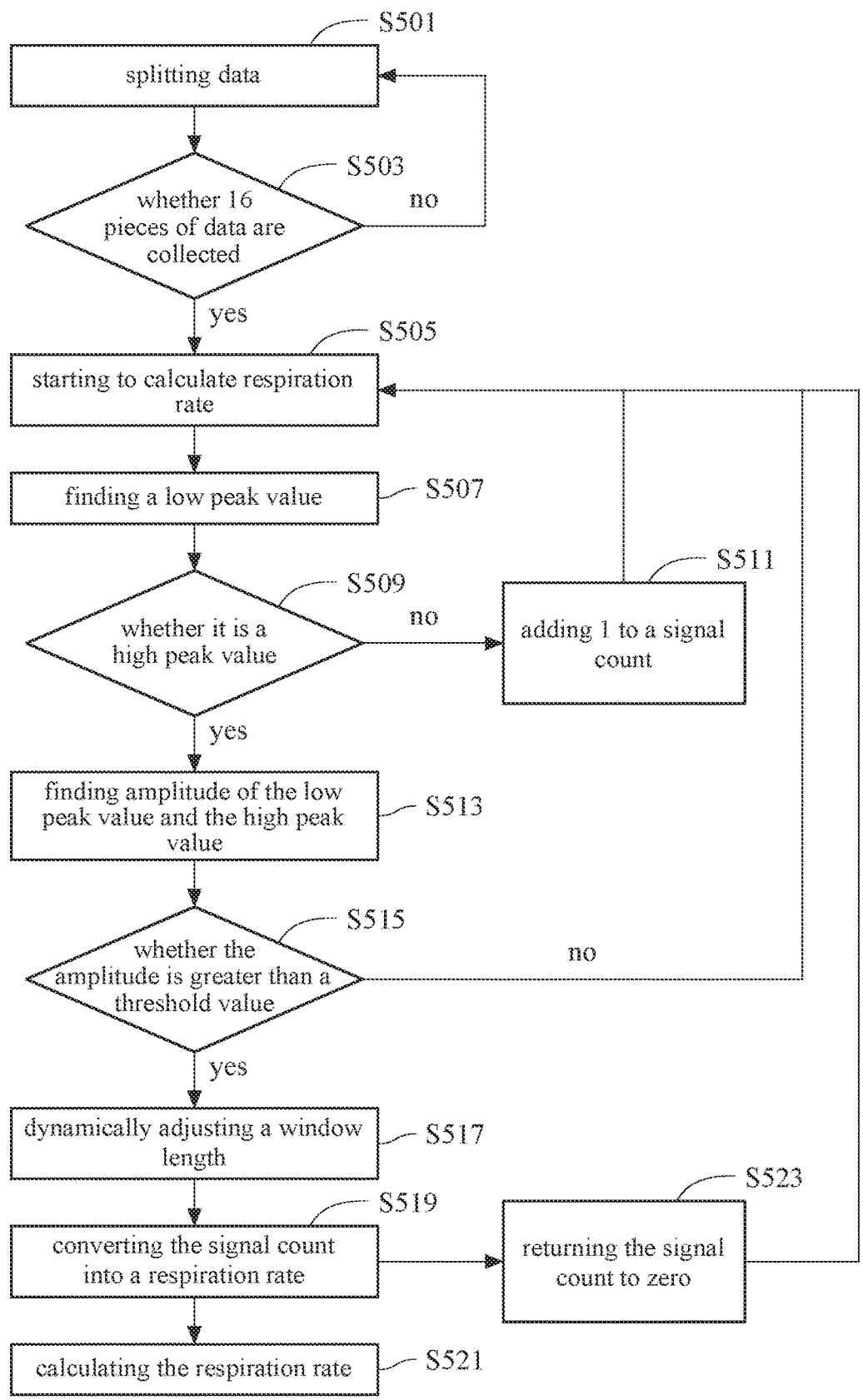
FIG. 12 is a flow chart illustrating method of calculating a respiration rate according to one or more embodiments of the present disclosure.

Please refer to FIG. 12, FIG. 12 is a flow chart illustrating method of calculating a respiration rate according to one or more embodiments of the present disclosure, and may be performed by the physiological information sensing device of the first embodiment to the fifth embodiment. For description convenience, the following uses the physiological information sensing device 1 of FIG. 1 for description. As shown in FIG. 12, method of calculating the respiration rate includes: step S501: splitting data; step S503: determining whether 16 pieces of data are collected; if determination result of step S503 is "no", performing step S501; if determination result of step S503 is "yes", performing step S505: starting to calculate respiration rate; step S507: finding a low peak value; step S509: whether it is a high peak value; if determination result of step S509 is "no", performing step S511: adding 1 to a signal count; if determination result of step S509 is "yes", performing step S513: finding amplitude of the low peak value and the high peak value; step S515: whether the amplitude is greater than a threshold value; if determination result of step S515 is "no", performing step S505; if determination result of step S515 is "yes", performing step S517: dynamically adjusting a window length; step S519: converting the signal count into a respiration rate; step S521: calculating the respiration rate; and step S523: returning the signal count to zero.

Specifically, in step S501, the first band pass filter 141*a* filters the demodulated signal based on the first frequency domain to generate the first filtered signal. In step S503, the computing element 15 determines whether signal corresponding to 16 peaks among the first filtered signal is collected, and considers the signal corresponding to 16 peaks as the signal of the first frequency domain in one window. Through step S503, calculation process may be sped up, and the effect of averaging may be provided to avoid drastic changes during the calculation process. In step S507, the computing element 15 finds the location of the low peak from the signal of the first frequency domain, such as the lowest peak. In step S509, the computing element 15 finds the location of the high peak from the signal of the first frequency domain, such as the highest peak. In step S511, the computing element 15 adds 1 to the signal count, wherein an initial value of the signal count may be 0. In step S513, the computing element 15 finds the peak values of the low peak and high peak obtained from step S507 and step S509. Through steps S507, S509 and S513, the computing element 15 may make sure that the signal of the first frequency domain are real detected signal, thereby avoiding background noise being used to performing the following calculation step. In step S515, the computing element 15 determines whether the amplitude difference between the peak value of the low peak and the peak value of the high peak is greater than a threshold value. In step S517, the computing element 15 adjusts the length of the dynamic window. In step S519, the computing element 15 calculates the amplitude difference between the peak value of the low peak and the peak value of the high peak, and divides the amplitude difference by a sampling rate and multiplies the amplitude difference with a duration, thereby calculating the respiration rate.

The method of calculating the respiration rate may be implemented by equation (1) below:

$$BR = \frac{Tpeak1 - Tpeak2}{Sampling\ Rate} \times 60 \quad\quad \text{equation (1)}$$

wherein BR is the respiration rate; Tpeak1 is the peak value of the high peak; Tpeak2 is the peak value of the low peak; Sampling Rate is the sampling rate of the physiological information sensing device 1; 60 is said duration, and the unit is "second".

Figure 13:
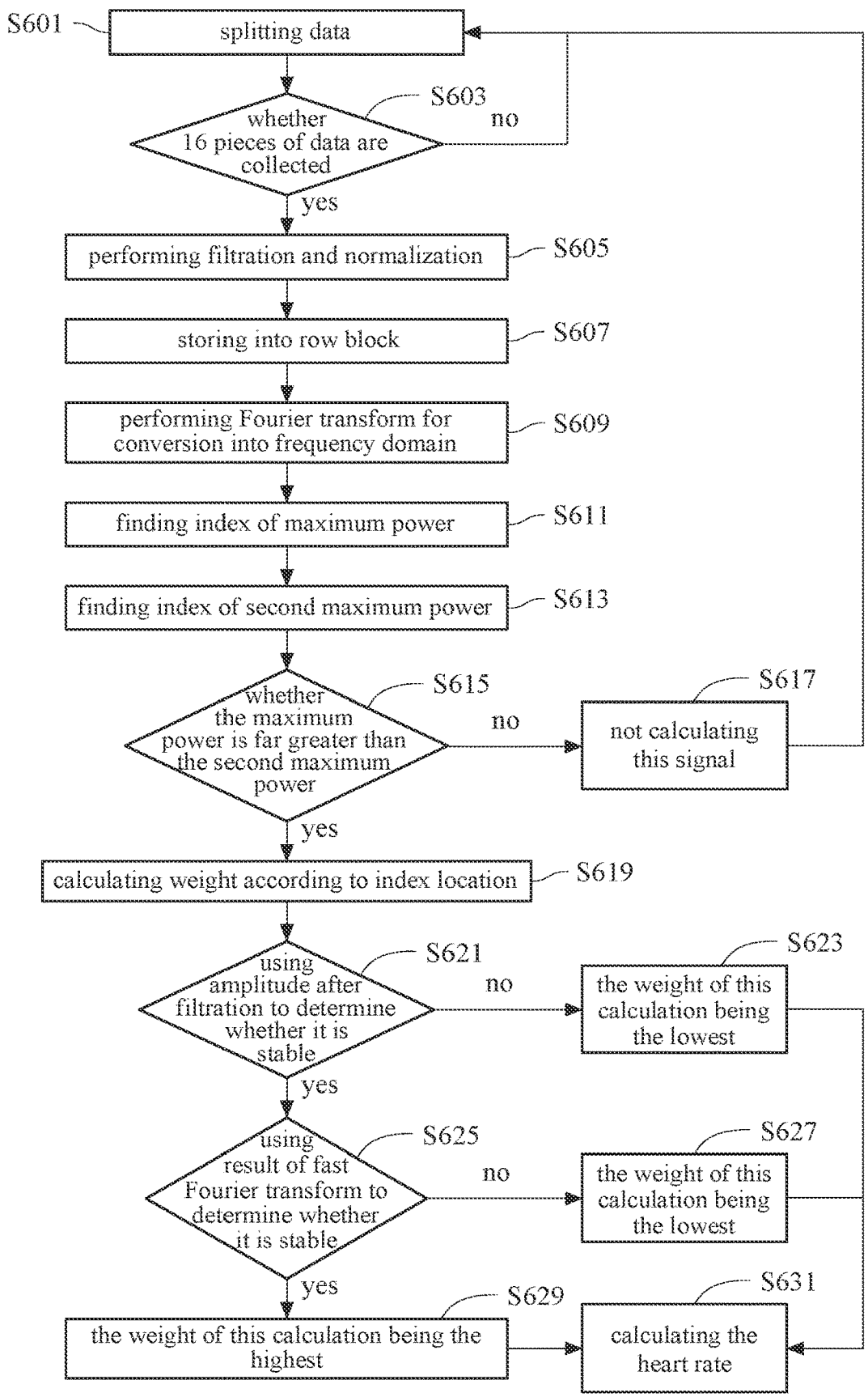
FIG. 13 is a flow chart illustrating method of calculating a heart rate according to one or more embodiments of the present disclosure.

Please refer to FIG. 13, FIG. 13 is a flow chart illustrating method of calculating a heart rate according to one or more embodiments of the present disclosure, and may be performed by the physiological information sensing device of the first embodiment to the fifth embodiment. As shown in FIG. 13, the method of calculating the heart rate includes: step S601: splitting data; step S603: determining whether 16 pieces of data are collected; if determination result of step S603 is "no", performing step S601; if determination result of step S603 is "yes", performing step S605: performing filtration and normalization; step S607: storing into row block; step S609: performing Fourier transform for conversion into frequency domain; step S611: finding index of maximum power; step S613: finding index of second maximum power; step S615: determining whether the maximum power is far greater than the second maximum power; if determination result of step S615 is "no", performing step S617: not calculating this signal; if determination result of step S615 is "yes", performing step S619: calculating weight according to index location; step S621: using amplitude after filtration to determine whether it is stable; if determination result of step S621 is "no", performing step S623: the weight of this calculation being the lowest; if determination result of step S621 is "yes", performing step S625: using result of fast Fourier transform to determine whether it is stable; if determination result of step S625 is "no", performing step S627: the weight of this calculation being the lowest; if determination result of step S625 is "yes", performing step S629: the weight of this calculation being the highest; and step S631: calculating the heart rate.

The method of calculating the heart rate may be implemented by equation (2) below:

$$HR = F\_index \times 60 \quad\quad \text{equation (2)}$$

wherein HR is the heart rate; F_index is a mean peak value index in frequency domain of the second filtered signal; 60 is said duration, and the unit is "second".

Figure 14:
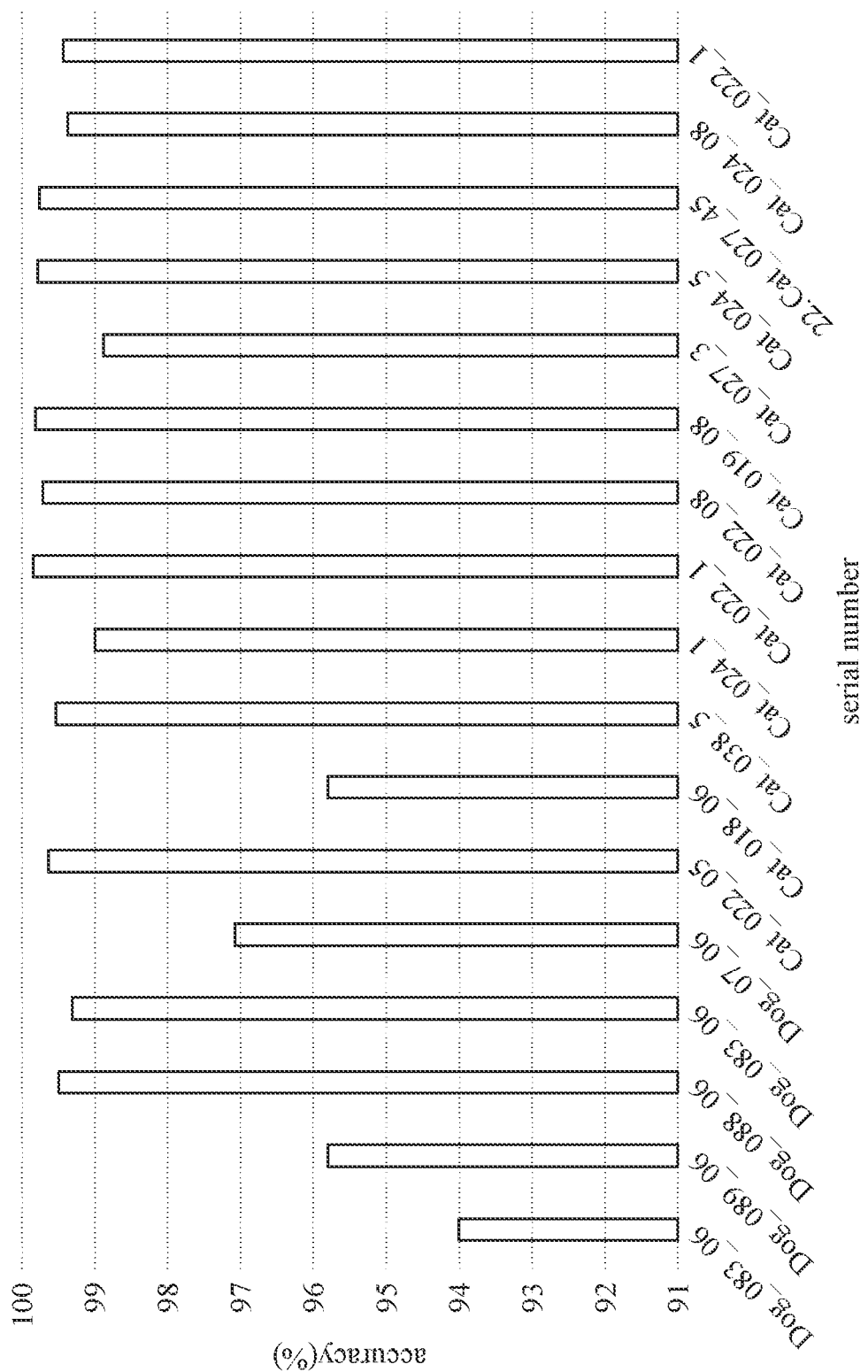
FIG. 14 shows result of using the physiological information sensing device and method of the present disclosure to measure heart rates of dogs and cats.

Please refer to FIG. 14, FIG. 14 shows result of using the physiological information sensing device and method of the present disclosure to measure heart rates of dogs and cats. FIG. 14 shows experiment results of 5 dogs and 12 cats with the compared result between heart rates obtained through the physiological information sensing device and method according to one or more embodiments above and the conventional technique. The result in FIG. 14 shows that the mean of accuracy reaches 98.57% (plus or minus 1.86%). In other words, if viewed from error rate (100% minus the corresponding accuracy), the highest error rate is not greater than 6%, and the mean of the error rate is around 1.425%, with a standard deviation of around 1.865%.

Figure 15:
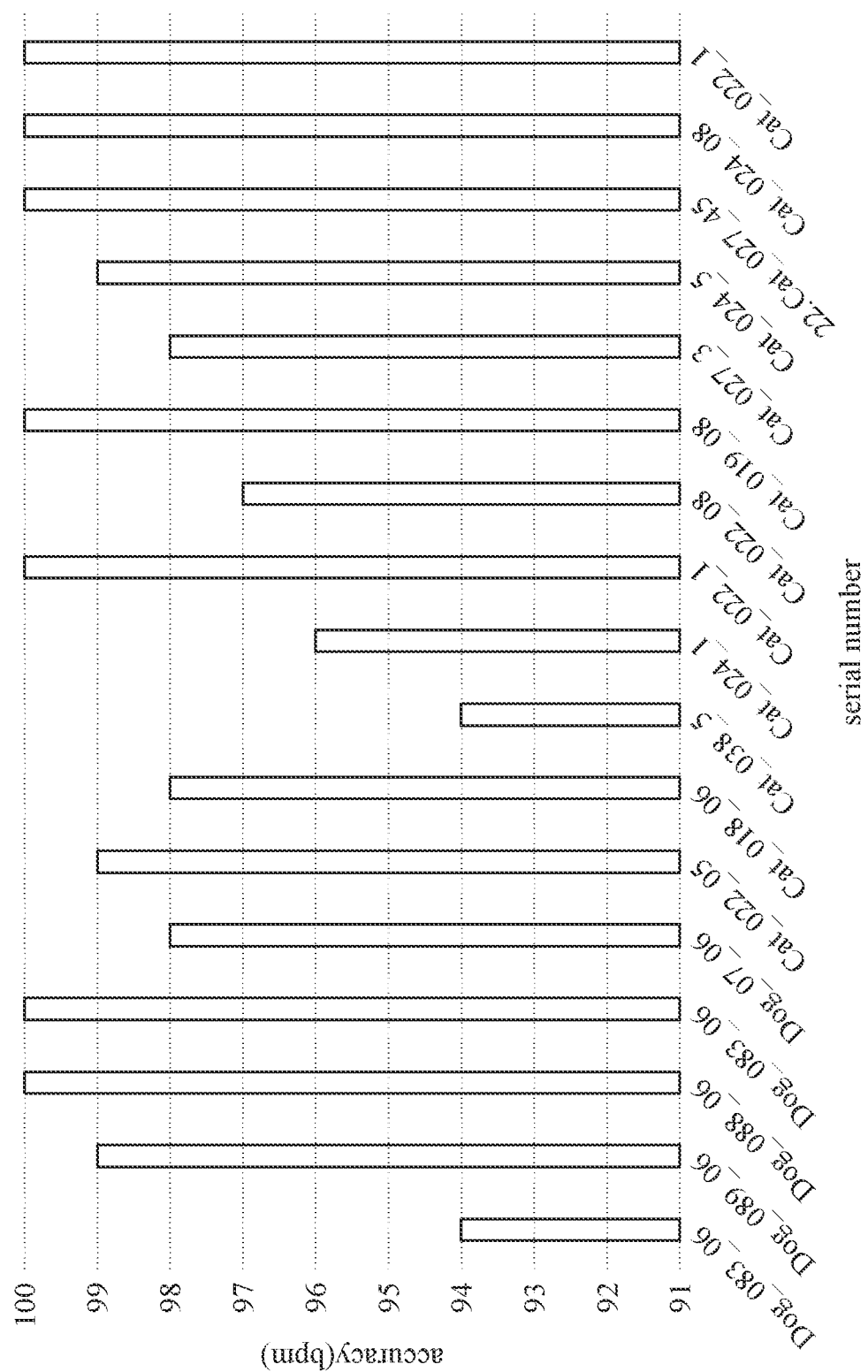
FIG. 15 shows another result of using the physiological information sensing device and method of the present disclosure to measure blood pressure of dogs and cats.

Please refer to FIG. 15, FIG. 15 shows another result of using the physiological information sensing device and method of the present disclosure to measure blood pressure of dogs and cats. FIG. 15 shows experiment results of 5 dogs and 12 cats with the compared result between blood pressures obtained through the physiological information sensing device and method according to one or more embodiments above and the conventional technique. The result in FIG. 15 shows that the mean of accuracy reaches 98.35% (plus or minus 2.03%). In other words, if viewed from error rate (100% minus the corresponding accuracy), the highest error rate is not greater than 6%, and the mean of the error rate is around 1.647%, with a standard deviation of around 2.029%.

In view of the above, the physiological information sensing device and method according to one or more embodiments of the present disclosure may output the heart rate and the respiration rate of animals instantly, for the pet owner to be able to keep track of pet health information at any time. In addition, the physiological information sensing device and method according to one or more embodiments of the present disclosure may be applied in a non-invasive and continuous manner, wherein the physiological information sensing device may be implemented as portable wearable device, and may be used without shaving hair from the pets, which improves convenience of use. The physiological information sensing device according to one or more embodiments of the present disclosure may take up smaller area, and since the comb-shaped structures of the transmitting antenna and the receiving antennas allow for the increase of the path length of the induced current, the radiation efficiency of the transmitting antenna and the receiving antennas may also be improved.

Although the aforementioned embodiments of this invention have been described above, this invention is not limited thereto. The amendment and the retouch, which do not depart from the spirit and scope of this invention, should fall within the scope of protection of this invention. For the scope of protection defined by this invention, please refer to the attached claims.

SYMBOLIC EXPLANATION 1,2,3,4,5: physiological information sensing device
10,20,30,40,50: signal generator
11,21,31,41,51: transmitting antenna
12,22,32,42,52: first receiving antenna
13,23,33,43,53: second receiving antenna
14,24,34,44,54: signal processing circuit
15,25,35,45,55: computing element
56: wireless transmission module
Ca,Cb: conductive part
111,121,131: main body part
112,122,132: comb-shaped part
122A,132A: first comb-shaped group
122B,132B: second comb-shaped group
140,244,340,440,544: mixer
141a,245a,343a,441a,547a: first band pass filter
141b,245b,343b,441b,547b: second band pass filter
241a,541a: first switch
241b,541b: second switch
242,542: power amplifier
243a,543a: first low-noise amplifier
243b,543b: second low-noise amplifier
341,545: prefilter
342,546: preamplifier
442a,548a: first post amplifier
442b,548b: second post amplifier
S101,S103,S105,S107,S109,S111,S201,S203,S205,S207, S209,S211,S213,S215,S217, S219,S301,S303,S305, S307,S309,S311,S313,S315,S401,S403,S405,S407, S409,S411,S413,S415,S501,S503,S505,S507,S509, S511,S513,S515,S517,S519, S521,S523,S601,S603, S605,S607,S609,S611,S613,S615,S617,S619,S621, S623, S625,S627,S629,S631: steps

What is claimed is:

1. A physiological information sensing device, comprising:

a signal generator configured to generate a microwave signal;
a transmitting antenna connected to the signal generator, and configured to transmit the microwave signal;
a first receiving antenna configured to receive a first reflected signal corresponding to the microwave signal;
a second receiving antenna configured to receive a second reflected signal corresponding to the microwave signal;
a signal processing circuit comprising:
    a mixer connected to the signal generator, the first receiving antenna and the second receiving antenna, and configured to integrate the first reflected signal and the second reflected signal, and perform demodulation with the microwave signal to generate a demodulated signal;
    a first band pass filter connected to the mixer, and configured to filter the demodulated signal based on a first frequency domain to generate a first filtered signal; and
    a second band pass filter connected to the mixer, and configured to filter the demodulated signal based on a second frequency domain to generate a second filtered signal; and
a computing element connected to the first band pass filter and the second band pass filter, with the computing element configured to output a heart rate and a respiration rate according to the first filtered signal and the second filtered signal.

2. The physiological information sensing device according to claim 1, wherein each of the transmitting antenna, the first receiving antenna and the second receiving antenna comprises a main body part and a plurality of comb-shaped parts, wherein the main body part of the transmitting antenna and the main body part of the first receiving antenna are oppositely disposed, the main body part of the transmitting antenna and the main body part of the second receiving antenna are oppositely disposed, and the first receiving antenna and the second receiving antenna are symmetrical to each other.

3. The physiological information sensing device according to claim 2, wherein the plurality of comb-shaped parts of the first receiving antenna comprise a first comb-shaped group and a second comb-shaped group, and one of the plurality of comb-shaped parts of the transmitting antenna is located between the first comb-shaped group and the second comb-shaped group.

4. The physiological information sensing device according to claim 2, wherein the plurality of comb-shaped parts of the second receiving antenna comprise a first comb-shaped group and a second comb-shaped group, and one of the plurality of comb-shaped parts of the transmitting antenna is located between the first comb-shaped group and the second comb-shaped group.

5. The physiological information sensing device according to claim 2, wherein the main body part of the transmitting antenna comprises a first main body part and a second main body part, and the first main body part and the second main body part are symmetrical to each other.

6. The physiological information sensing device according to claim 2, wherein an extending direction of the plurality of comb-shaped parts of the transmitting antenna and an extending direction of the plurality of comb-shaped parts of the first receiving antenna are parallel to each other, and the extending direction of the plurality of comb-shaped parts of the transmitting antenna and an extending direction of the plurality of comb-shaped parts of the second receiving antenna are parallel to each other.

7. The physiological information sensing device according to claim 1, wherein the signal processing circuit further comprises:
- a power amplifier connected between the signal generator and the transmitting antenna, and configured to amplify the microwave signal, and output the microwave signal that is amplified to the transmitting antenna;
- a first low-noise amplifier connected to the signal generator, and configured to amplify the microwave signal, and output the microwave signal that is amplified to the mixer;
- a second low-noise amplifier connected to the mixer, and configured to amplify the first reflected signal and the second reflected signal, and output the first reflected signal and the second reflected signal that are amplified to the mixer;
- a first switch connected between the signal generator and the power amplifier, and connected between the signal generator and the first low-noise amplifier, and configured to be controlled to output the microwave signal to the power amplifier or the first low-noise amplifier; and
- a second switch connected between the power amplifier and the transmitting antenna, connected between the first receiving antenna and the second low-noise amplifier and connected between the second receiving antenna and the second low-noise amplifier, with the second switch configured to be controlled to output the microwave signal that is amplified to the transmitting antenna, or output the first reflected signal and the second reflected signal that are amplified to the mixer.

8. The physiological information sensing device according to claim 1, wherein the signal processing circuit further comprises:
- a prefilter connected to an output terminal of the mixer, with the prefilter configured to perform low-pass filtration on the demodulated signal and output the demodulated signal that is filtered; and
- a preamplifier connected to the prefilter, the first band pass filter and the second band pass filter, with the preamplifier configured to amplify the demodulated signal that is filtered to output the demodulated signal to the first band pass filter and the second band pass filter.

9. The physiological information sensing device according to claim 1, wherein the signal processing circuit further comprises:
- a first post amplifier connected between the first band pass filter and the computing element, and configured to amplify the first filtered signal, and output the first filtered signal that is amplified to the computing element; and
- a second post amplifier connected between the second band pass filter and the computing element, and configured to amplify the second filtered signal, and output the second filtered signal that is amplified to the computing element.

10. The physiological information sensing device according to claim 1, further comprising:
- a wireless transmission module connected to the computing element, and configured to output the heart rate and the respiration rate.

11. A physiological information sensing method, comprising:
- generating, by a signal generator, a microwave signal;
- transmitting, by a transmitting antenna, the microwave signal;
- receiving, by a first receiving antenna, a first reflected signal corresponding to the microwave signal, and receiving, by a second receiving antenna, a second reflected signal corresponding to the microwave signal;
- integrating, by a signal processing circuit, the first reflected signal and the second reflected signal, and performing, by the signal processing circuit, demodulation with the microwave signal to generate a demodulated signal;
- filtering, by the signal processing circuit, the demodulated signal based on a first frequency domain to generate a first filtered signal, and filtering, by the signal processing circuit, the demodulated signal based on a second frequency domain to generate a second filtered signal; and
- outputting, by a computing element, a heart rate and a respiration rate according to the first filtered signal and the second filtered signal.

12. The physiological information sensing method according to claim 11, further comprising, by the signal processing circuit, performing:
- amplifying the microwave signal through a power amplifier and outputting the microwave signal that is amplified to the transmitting antenna;
- amplifying the microwave signal through a first low-noise amplifier and outputting the microwave signal that is amplified to a mixer of the signal processing circuit;
- receiving the first reflected signal and the second reflected signal through a second low-noise amplifier; and
- amplifying the first reflected signal and the second reflected signal through the second low-noise amplifier, and outputting the first reflected signal and the second reflected signal that are amplified to the mixer through the second low-noise amplifier.

13. The physiological information sensing method according to claim 11, further comprising, by the signal processing circuit, performing:
- performing low-pass filtration on the demodulated signal; and
- amplifying the demodulated signal that is filtered to output the demodulated signal.

14. The physiological information sensing method according to claim 11, further comprising, by the signal processing circuit, performing:
- amplifying the first filtered signal, and outputting the first filtered signal that is amplified to the computing element; and
- amplifying the second filtered signal, and outputting the second filtered signal that is amplified to the computing element.

15. The physiological information sensing method according to claim 11, further comprising: outputting, by a wireless transmission module, the heart rate and the respiration rate.

* * * * *